United States Patent
Aftanas

(10) Patent No.: US 8,276,794 B2
(45) Date of Patent: *Oct. 2, 2012

(54) VEHICLE ARTICLE CARRIER HAVING RELEASABLE AND STOWABLE CROSS BARS

(75) Inventor: Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 277 days.

This patent is subject to a terminal disclaimer.

(21) Appl. No.: 12/639,480

(22) Filed: Dec. 16, 2009

(65) Prior Publication Data

US 2010/0327032 A1 Dec. 30, 2010

Related U.S. Application Data

(63) Continuation-in-part of application No. 12/136,854, filed on Jun. 11, 2008.

(60) Provisional application No. 60/934,491, filed on Jun. 13, 2007.

(51) Int. Cl.
*B60R 9/00* (2006.01)
*B60R 9/052* (2006.01)
*B60R 9/048* (2006.01)

(52) U.S. Cl. ........ 224/321; 224/315; 224/317; 224/322; 224/324

(58) Field of Classification Search .................. 224/315, 224/317, 324, 323, 322, 325, 326, 331
See application file for complete search history.

(56) References Cited

U.S. PATENT DOCUMENTS

| | | | |
|---|---|---|---|
| 5,377,890 A | | 1/1995 | Brunner |
| 5,588,572 A | * | 12/1996 | Cronce et al. ................. 224/321 |
| 6,102,265 A | * | 8/2000 | Stapleton ....................... 224/321 |
| 6,112,964 A | * | 9/2000 | Cucheran et al. ............. 224/321 |
| 6,286,739 B1 | * | 9/2001 | Stapleton ....................... 224/321 |
| 6,811,066 B2 | * | 11/2004 | Aftanas et al. ................. 224/321 |
| 7,066,364 B2 | * | 6/2006 | Kmita et al. ................... 224/321 |
| 7,090,103 B2 | * | 8/2006 | Aftanas et al. ................. 224/321 |
| 7,198,184 B2 | * | 4/2007 | Aftanas et al. ................. 224/309 |
| 7,441,679 B1 | * | 10/2008 | Harberts et al. ................ 224/321 |
| 7,458,490 B2 | * | 12/2008 | Klinkman et al. ............. 224/321 |
| 7,806,306 B2 | * | 10/2010 | Aftanas ........................ 224/321 |
| 2008/0101885 A1 | | 5/2008 | Kmita |
| 2008/0257924 A1 | | 10/2008 | Kmita et al. |
| 2008/0308590 A1 | | 12/2008 | Aftanas et al. |

* cited by examiner

*Primary Examiner* — Nathan J Newhouse
*Assistant Examiner* — Lester L Vanterpool
(74) *Attorney, Agent, or Firm* — Harness, Dickey & Pierce, P.L.C.

(57) ABSTRACT

A vehicle article carrier system that may have a pair of support rails and at least one cross bar. The cross bar may have an end support at each opposing end thereof. Each of the support rails may include an elongated recess extending parallel to a longitudinal axis thereof, where the elongated recess may be shaped generally in accordance with the cross bar, for receiving the cross bar when the cross bar is placed in a stowed orientation. Each of the support rails may further have at least one primary locking bar for supporting said cross bar in an operative position extending generally perpendicularly between the support rails, and at least a pair of secondary locking bars for supporting the cross bar in said elongated recess when the cross bar is placed in the stowed orientation in one of the support rails. Each of the end supports may include a locking assembly for securing the cross bar to either one of said primary or secondary locking bars, to thus place said cross bar in either the operative position or the stowed position.

20 Claims, 26 Drawing Sheets

VEHICLE ARTICLE CARRIER HAVING RELEASABLE AND STOWABLE CROSS BARS

CROSS REFERENCE TO RELATED APPLICATION

The present application is a continuation-in-part of U.S. patent application Ser. No. 12/136,854, filed on Jun. 11, 2008, and published as U.S. Patent Publication No. 2008-0308590, which claims priority from U.S. Provisional Patent Application Ser. No. 60/934,491, filed Jun. 13, 2007, the entire disclosure of which is hereby incorporated by reference into the present disclosure.

FIELD

The present disclosure relates to vehicle article carrier systems and methods, and more particularly to a vehicle article carrier system and method that includes a pair of cross bars that can be stowed on a pair of support rails, and quickly and easily moved from their stowed positions into operative positions extending between the support rails when the vehicle article carrier system needs to be used to support articles thereon.

BACKGROUND

Vehicle article carriers are used in a variety of automotive applications to transport articles of various shapes and sizes above an outer body surface of a vehicle. Typically, a pair of elongated rails is secured to the outer body surface of the vehicle generally parallel to one another. One or more cross bars are then secured at opposite ends to the rails. Typically the cross bars are not stowable, meaning that even when the article carrier is not in use, the cross bars would be secured to the rails extending perpendicularly between the rails. Of course, if the cross bars are removable, then they could be removed entirely from the rails, but then this gives rise to the problem of storing the cross bars, as well as the inconvenience of having to physically disassemble the cross bars from the remainder of the vehicle article carrier. Often, external tools may be required for such disassembly, which further adds to the inconvenience for the user. Storage of such components within the vehicle can also be difficult and/or consume valuable and limited cargo space. Storing the cross bars separately from the vehicle may give rise to the inconvenient situation where a need arises to use the vehicle article carrier, while the user is away from home or work with the vehicle, but the cross bars are being stored at home or at a place of work.

SUMMARY

In one aspect the present disclosure involves a vehicle article carrier system that may have a pair of support rails and at least one cross bar. The cross bar may have an end support at each opposing end thereof. Each of the support rails may include an elongated recess extending parallel to a longitudinal axis thereof, where the elongated recess may be shaped generally in accordance with the cross bar, for receiving the cross bar when the cross bar is placed in a stowed orientation. Each of the support rails may further have at least one primary locking bar for supporting said cross bar in an operative position extending generally perpendicularly between the support rails, and at least a pair of secondary locking bars for supporting the cross bar in said elongated recess when the cross bar is placed in the stowed orientation in one of the support rails. Each of the end supports may include a locking assembly for securing the cross bar to either one of said primary or secondary locking bars, to thus place said cross bar in either the operative position or the stowed position.

In another aspect the present disclosure may involve a vehicle article carrier system that includes a pair of support rails fixedly secured to an outer body surface of a vehicle. A pair of cross bars, each having opposing ends, with each said opposing end including an end support may be included for supporting articles thereon. Each of the support rails may include an elongated recess extending parallel to a longitudinal axis thereof, with the elongated recess being shaped generally in accordance with the cross bar, for receiving an associated one of the cross bars when the associated one of the cross bars is placed in a stowed orientation, and such that an upper surface of the associated one of the cross bars is generally flush with an upper surface of its associated support rail. Each of the support rails further may include a pair of spaced apart primary locking bars, one of each of the primary locking bars of each one of the support rails cooperating to support a first one of the cross bars in an operative position generally perpendicularly between the support rails, and the other ones of the primary locking bars of the support rails being adapted to support a second one of the cross bars in the operative position extending generally perpendicularly between the support rails, and generally parallel to the first one of the cross bars. Each of the support rails further including a pair of secondary locking bars, the first one of the cross bars being secured to the secondary locking bars in a first one of the support rails when a first one of the cross bars is placed in the elongated recess of the first one of the support rails, and the second one of the cross bars being secured to the second one of the support rails within the elongated recess thereof when the second one of the cross bars is placed in the stowed orientation. And each of said end support of each cross bar including a locking assembly adapted to engage any of the locking bars, each said locking assembly including a user engageable actuating member for placing the locking assembly in latched and unlatched conditions relative to the support rails.

In still another aspect the present disclosure may involve a vehicle article carrier system that includes a pair of support rails fixedly secured to an outer body surface of a vehicle. A pair of cross bars, each having opposing ends, with each said opposing end including an end support may be included for supporting articles thereon. Each of the support rails may include an elongated recess extending parallel to a longitudinal axis thereof, with the elongated recess being shaped generally in accordance with the cross bar, for receiving an associated one of the cross bars when the associated one of the cross bars is placed in a stowed orientation, and such that an upper surface of the associated one of the cross bars is generally flush with an upper surface of its associated support rail. Each of the support rails further may include a pair of spaced apart primary locking bars, one of each of the primary locking bars of each one of the support rails cooperating to support a first one of the cross bars in an operative position generally perpendicularly between the support rails, and the other ones of the primary locking bars of the support rails being adapted to support a second one of the cross bars in the operative position extending generally perpendicularly between the support rails, and generally parallel to the first one of the cross bars. Each of the support rails further including a pair of secondary locking bars, the first one of the cross bars being secured to the secondary locking bars in a first one of the support rails when a first one of the cross bars is placed in the elongated recess of the first one of the support rails, and the second one of the cross bars being secured to the second one of the support rails within the elongated recess thereof when the second one of the cross bars is placed in the stowed orientation. Each said end support of each cross bar also including a locking assembly adapted to engage any of the locking bars. Each locking assembly may including a user engageable actuating member moveable between open and closed positions; a locking element responsive to movement of the user engageable actuating member for placing the locking assembly in latched and unlatched conditions relative to the support rails; and a spring for biasing the locking element into open and closed positions, depending on a position of the user engageable actuating member.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
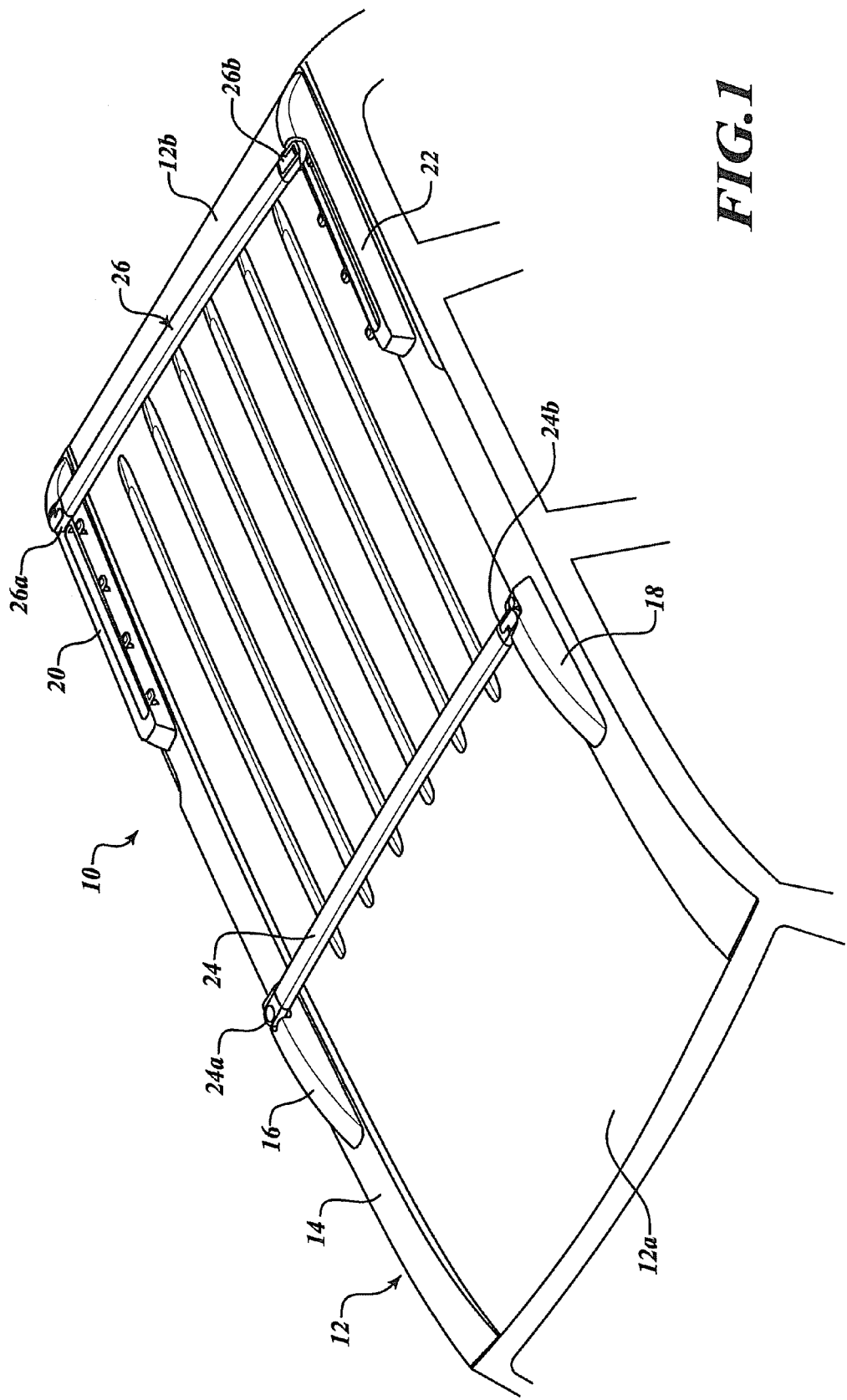
FIG. 1 is a perspective view of a vehicle article carrier of the present disclosure mounted on a roof portion of a motor vehicle, with a pair of cross bars of the carrier in their operable (i.e., non-stowed) positions.
Figure 2:
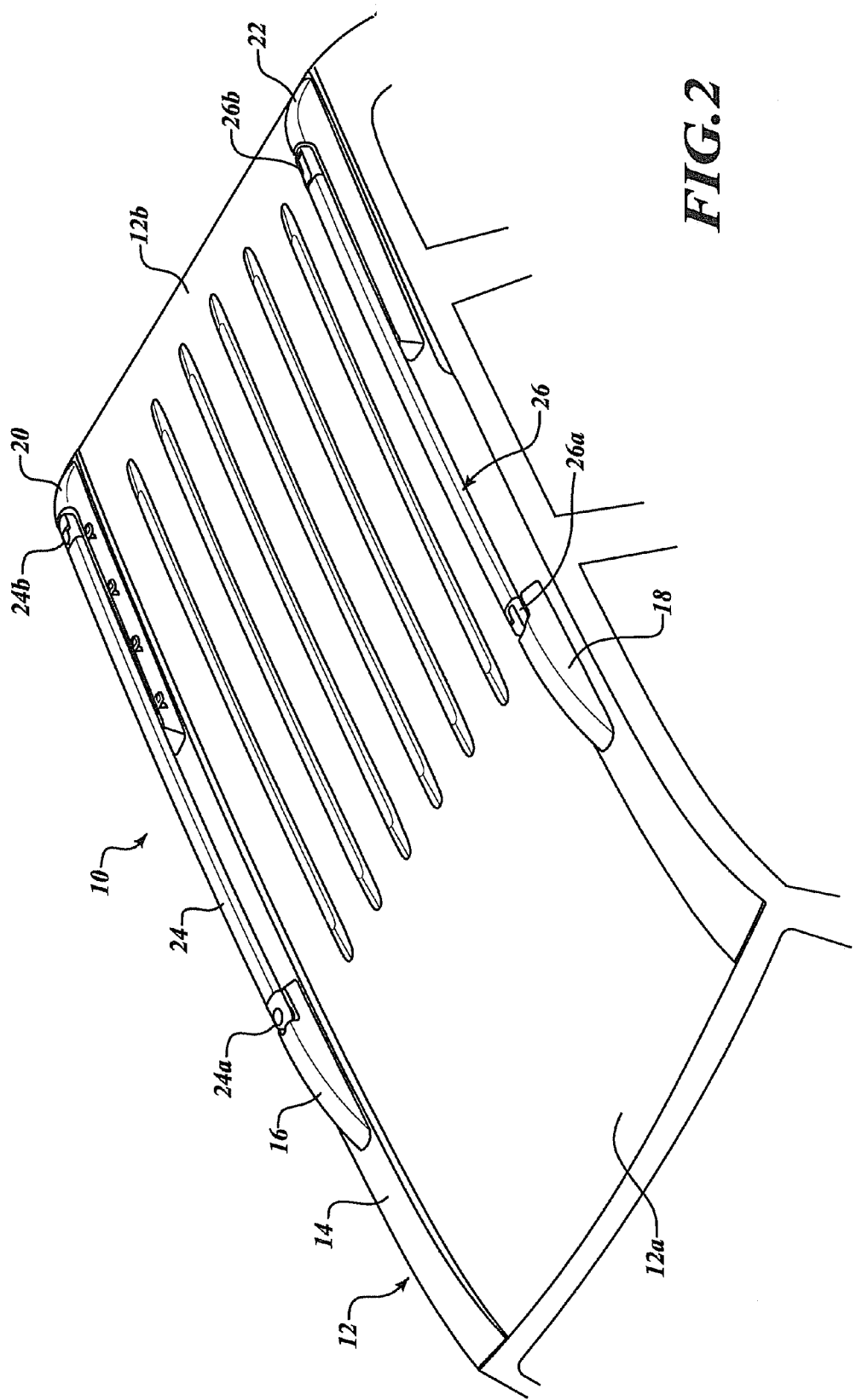
FIG. 2 is a perspective view of the vehicle article carrier of FIG. 1 but with the two cross bars in their stowed positions.
Figure 3:
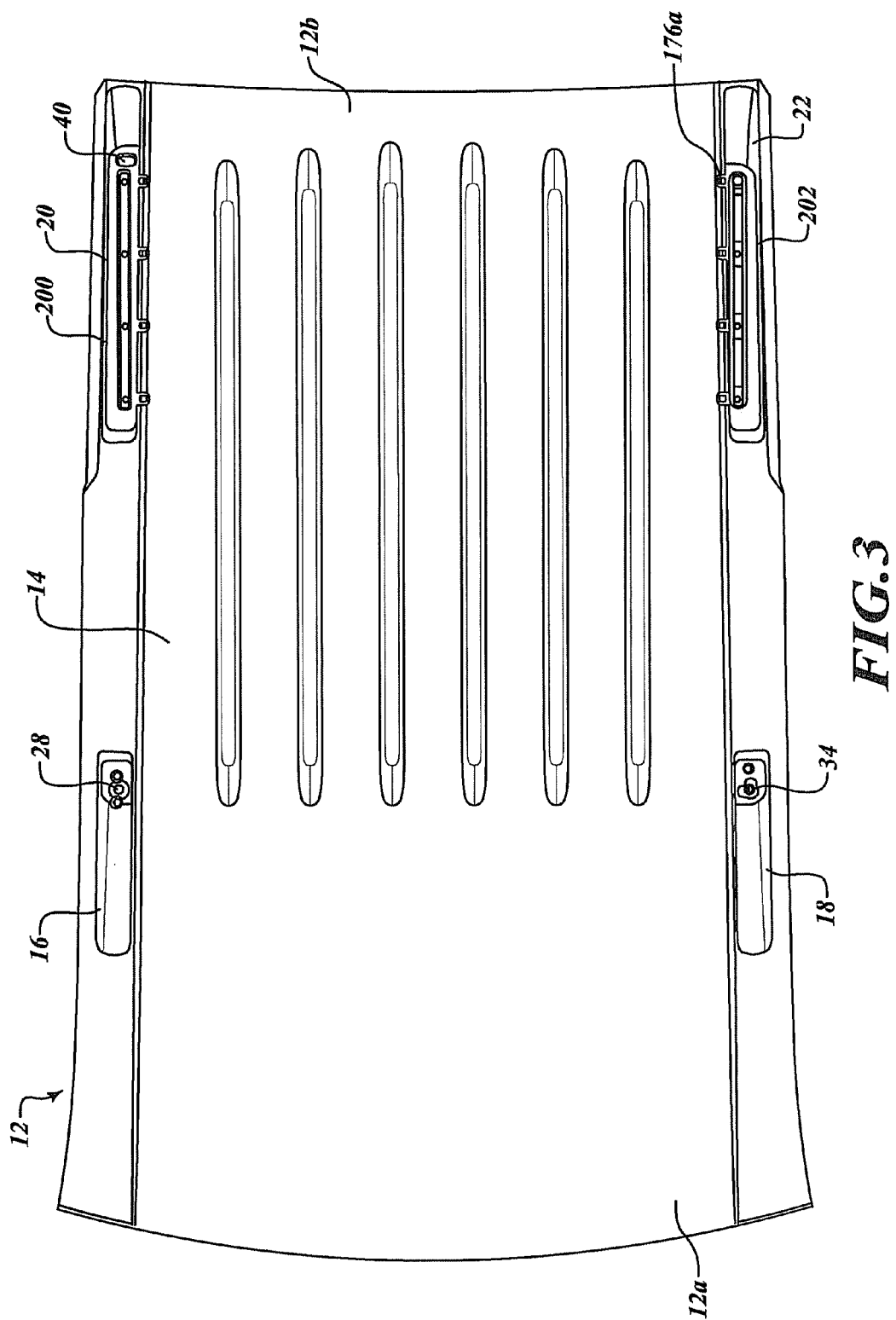
FIG. 3 is a top plan view of the vehicle article carrier but without the cross bars positioned thereon.

Referring to FIGS. 1-3, there is shown a vehicle article carrier apparatus 10 mounted on an outer body surface 14 of a motor vehicle 12. The apparatus 10 generally includes first and second forward support elements 16 and 18, respectively, and first and second rear support elements 20 and 22, respectively. In a first (i.e., "operative") configuration, a forward cross bar 24 is supported from the forward support elements 16,18 and a rear cross bar 26 is supported from the rear support elements 20,22. In a second (i.e., "stowed") configuration, the forward cross bar 24 is supported from the support elements 16 and 20 while the rear cross bar 26 is supported from support elements 18 and 22. In the stowed configuration shown in FIG. 2, the cross bars 24,26 are advantageously positioned to minimize aerodynamic drag.

Figure 4:
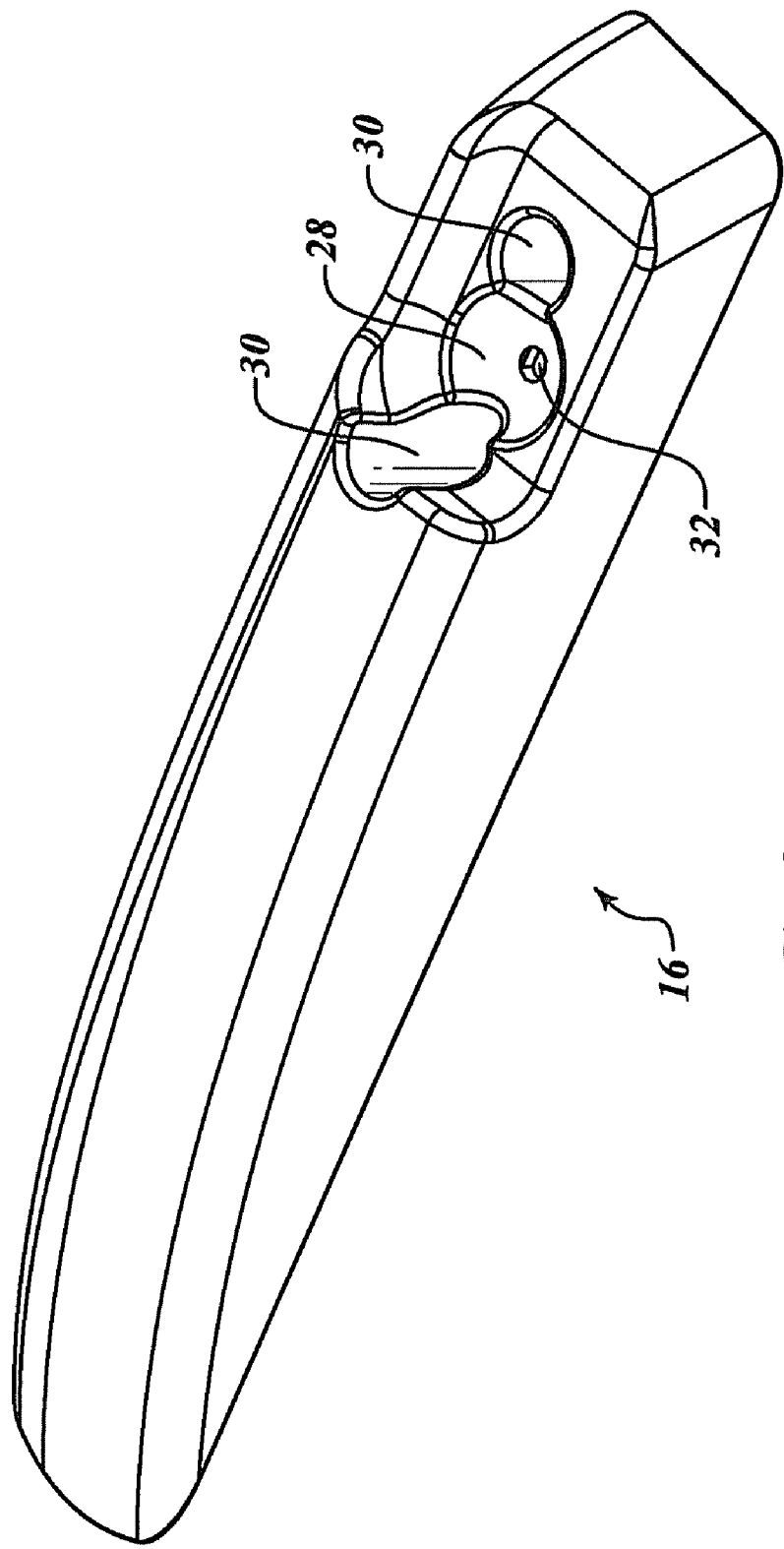
FIG. 4 is an enlarged perspective view of a first one of the forward support elements.

With further reference to FIGS. 3 and 4, the first forward support element 16 includes a partial spherical recess 28 and a pair of holes 30. The recess 28 is used to mount a first end support 24a of the forward cross bar 24 for pivoting movement as will be described further in the following paragraphs. The holes 30 enable external fastening elements to be used to secure a bracket (not shown) to the outer body surface 14 underneath the support element 16, which also enables the support element 16 to be fixedly secured to the outer body surface 14. The recess 28 also has a hole 32 that facilitates mounting of the end support 24a thereto, as will be described in more detail in the following paragraphs.

Figure 5:
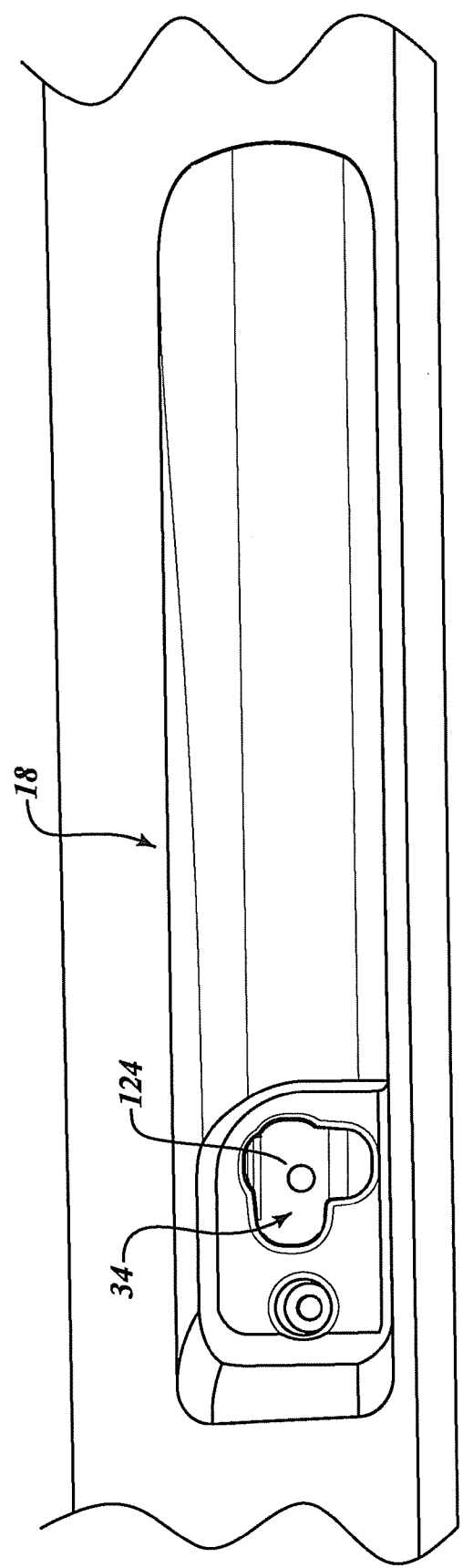
FIG. 5 is an enlarged plan view of a second one of the forward support elements.

FIGS. 3 and 5 illustrate in greater detail the second forward support element 18. Support element 18 includes an opening 34 that enables either a second end support 24b of the forward cross bar 24 or a first end support 26a of the rear cross bar 26 to be secured thereto.

Figure 6:
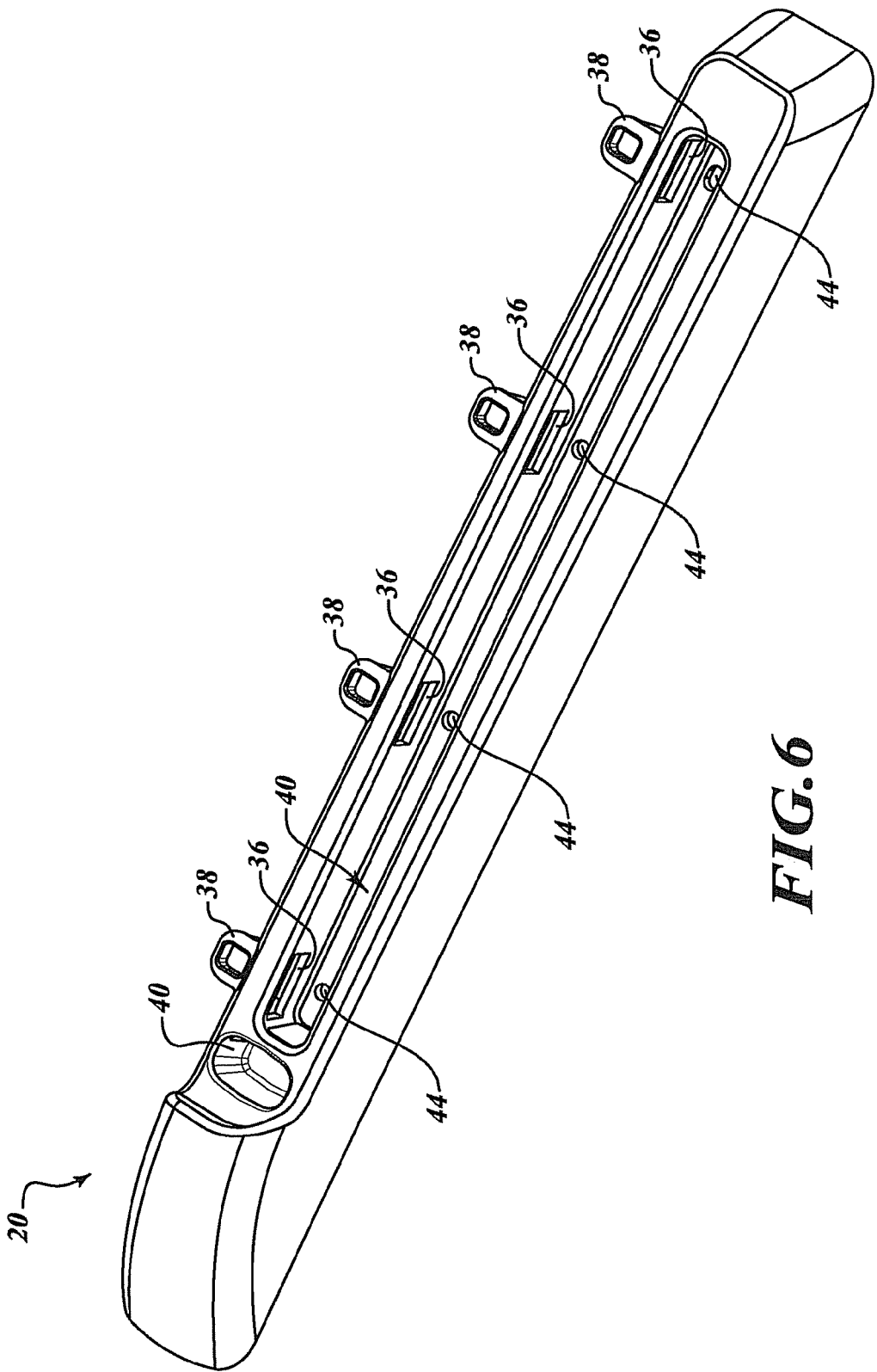
FIG. 6 is an enlarged perspective view of a first one of the rear support elements.

FIGS. 3 and 6 illustrate the first rear support element 20 in greater detail. The support element 20 includes a plurality of spaced apart slots 36 each having a securing loop 38 aligned therewith. Any one of slots 36 may be used to facilitate engagement of the end support 26a of the rear cross bar 26 with the support element 20 when the rear cross bar 26 is in its operative position. This also enables adjustable positioning of the rear cross bar 26 along the rear support elements 20 and 22. An opening 40 permits the end support 24b of the forward cross bar 24 to engage the support element 20 when the forward cross bar 24 is in its stowed position. A channel 42 allows sliding movement of the end support 26a therealong when the rear cross bar 26 is being re-positioned. Holes 44 in a bottom wall 42 enable external securing elements (not shown), for example RIVNUT® fasteners, to be used to secure the support element 20 to the outer body surface 14 of the vehicle 12.

Figure 7:
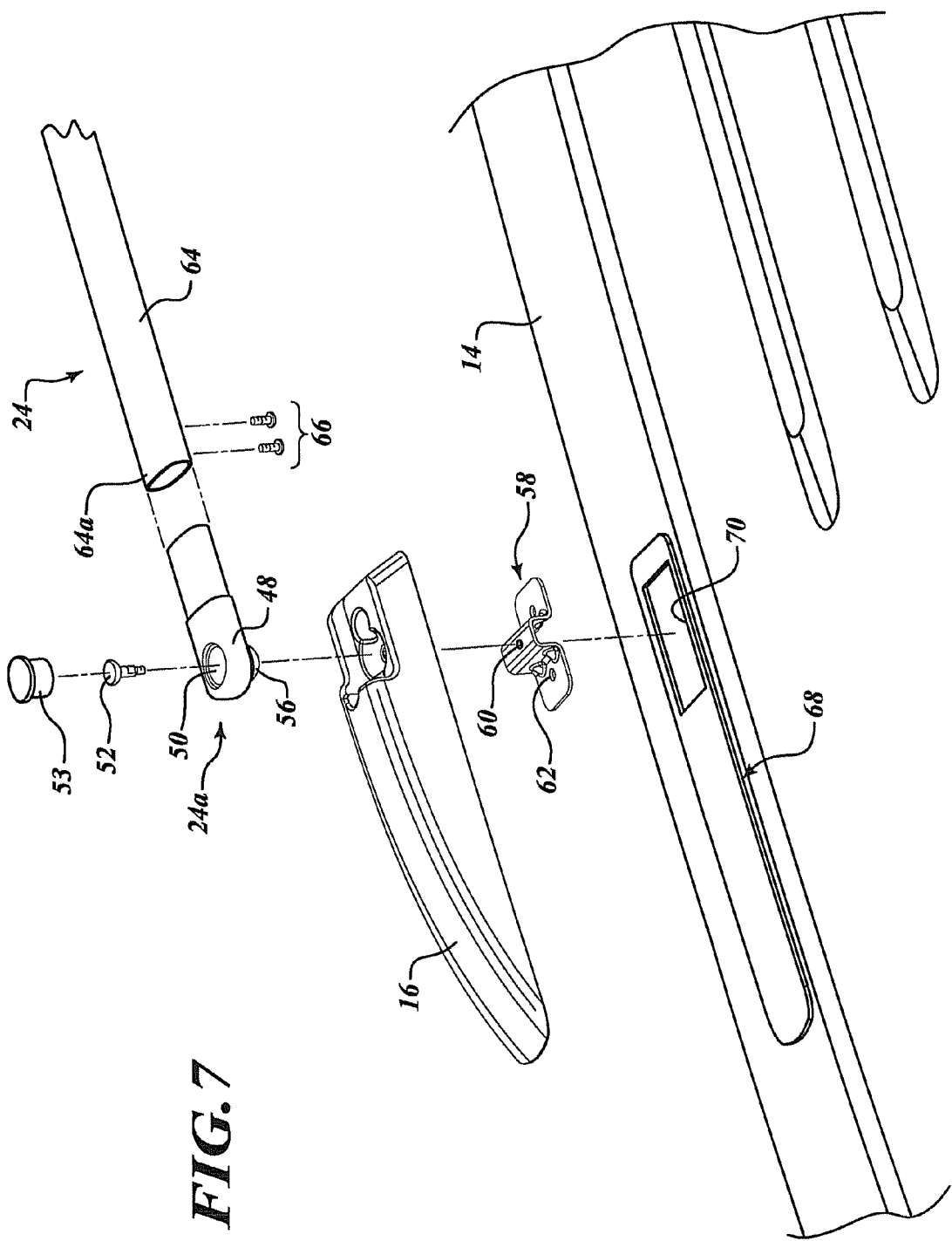
FIG. 7 is an exploded perspective view of the components at a first end of the forward cross bar.

Referring to FIG. 7, the construction of end support 24a of the forward cross bar 24 is shown. The end support 24a includes an end support component 48 having a hole 50 through which a fastener 52 can be inserted. A spherical portion 54 is integrally formed with the end support component 48 and includes a slot 56 which enables the forward cross bar 24 to be lifted away from support element 18 at end support 24b. The spherical portion 54 also enables pivoting movement of the forward cross bar 24 about the fastener 52. The fastener 52 is secured to a bracket 58 through an opening 60 such that it cannot be readily removed from the bracket 58 once the end support 24a is assembled to the support element 16. The bracket 58 may be held to the outer body surface of the vehicle 12 with a pair of fastening elements, for example RIVNUT® fasteners (not shown), that extend through holes 62 in a pair of flanges of the bracket 58. The bracket 58, being fixedly secured to the outer body surface 14, provides a structurally strong point of attachment for the end support 24a. A cap 53 may be used to provide a decorative covering for the hole 50.

The end support component 48 may be secured to a first end 64a of a cross bar component 64 of the forward cross bar 24. In this regard it will be appreciated the cross bar component 64 forms a tubular component that is preferably made from a structurally strong material, for example extruded or roll formed aluminum. Fastening elements 66 may extend through holes (not shown) in the first end 64a to engage openings (not shown) in the end support component 48 so that the end support component 48 is fixedly secured to the cross bar component 64.

With further reference to FIG. 7, support element 16 may be positioned over a mounting pad 68 placed on the outer body surface 14 of the vehicle 12. The mounting pad 68 may be made from rubber or any other suitable material that is able to protect the outer body surface 14 against scratching or marring during installation of the support element 16 thereto. An opening 70 provides clearance for the bracket 58.

Figure 8:
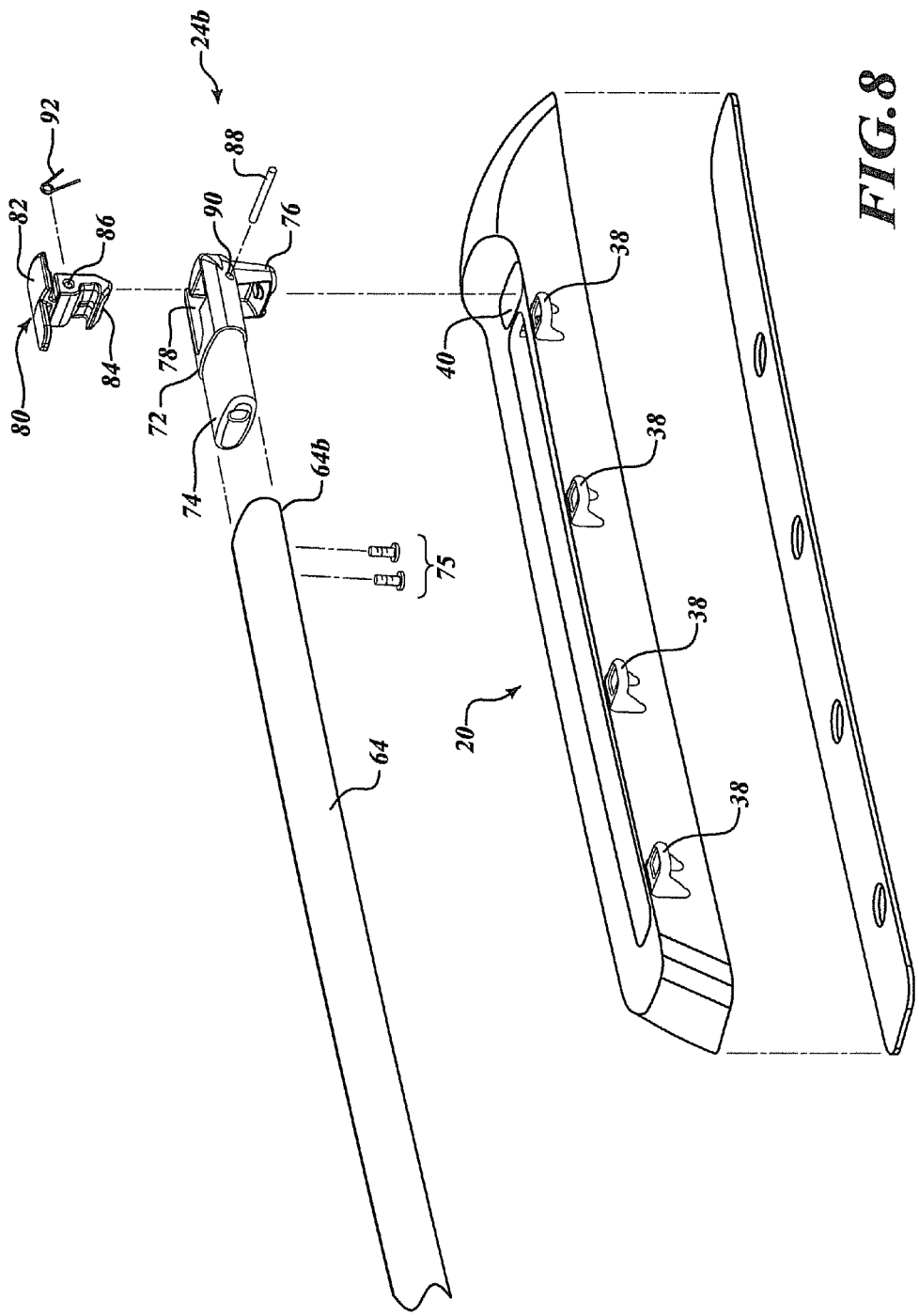
FIG. 8 is an exploded perspective view of the components at the second end of the forward cross bar, in addition to the first one of the rear support elements.

Referring to FIG. 8, the construction of the second end support 24b of the forward cross bar 24 is shown in greater detail. End support 24b includes an end support component 72 having a neck portion 74 and a base portion 76. The neck portion 74 may be inserted into an end 64b of the cross bar component 64 of the forward cross bar 24 and then secured via one or more conventional fastening elements 75 that extend through holes (not shown) at end 64b, and through holes (not shown) in neck portion 74. FIG. 8 also illustrates a pad 77 having a plurality of holes 77a that may be interposed between the support element 20 and the outer body surface 12a. The holes 77a enables fastening elements (not shown) to extend therethrough, and through openings in the support element 20, to secure the support element fixedly to the outer body surface 12a.

The base portion 76 of the end support component 72 has an opening 78 that receives a locking member 80 therein. The locking member 80 includes a manually graspable portion 82 and a jaw portion 84. A bore 86 receives a pivot pin 88, which also extends through a bore 90 in the end support component 72. In this manner the locking member 80 is pivotally supported within the opening 78 of the end support component 72.

Figure 9:
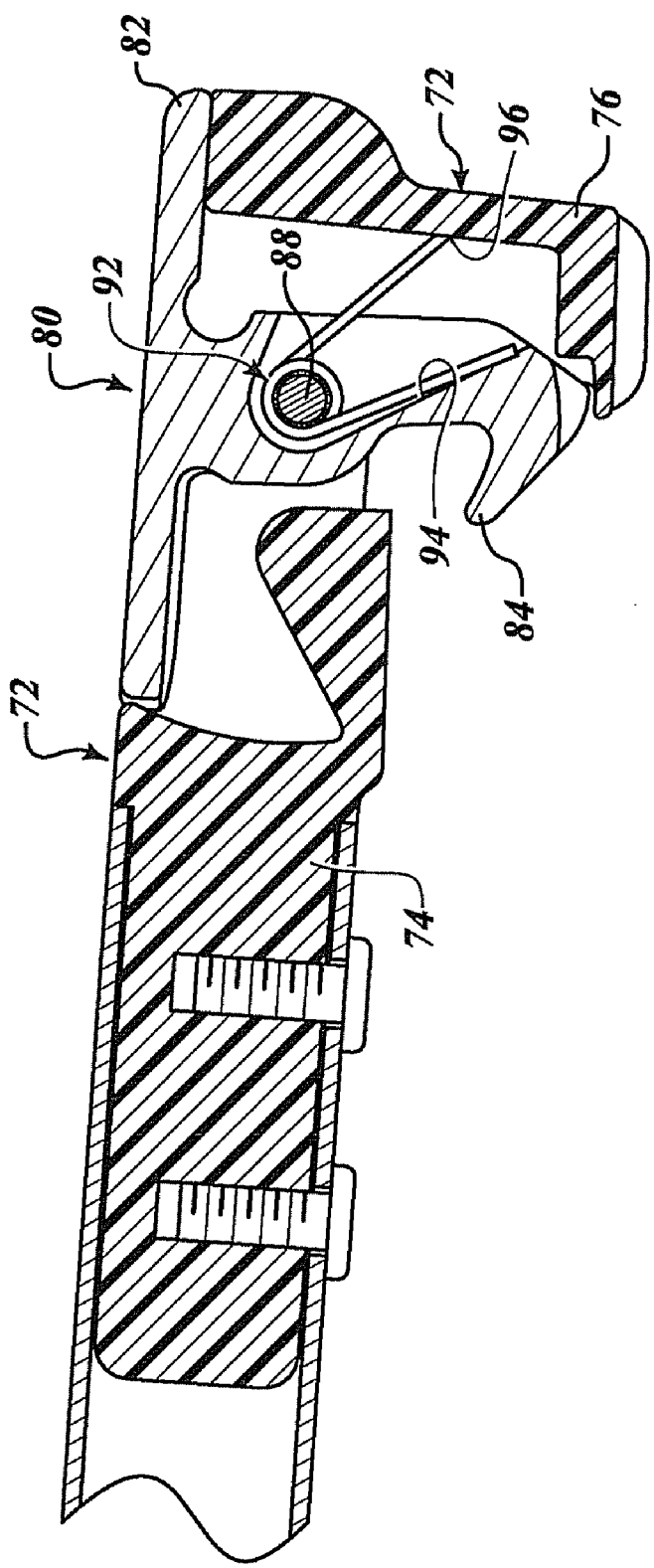
FIG. 9 is a cross sectional side view illustrating the mounting of the locking member within the end support component of the end support shown in FIG. 8.
Figure 17:
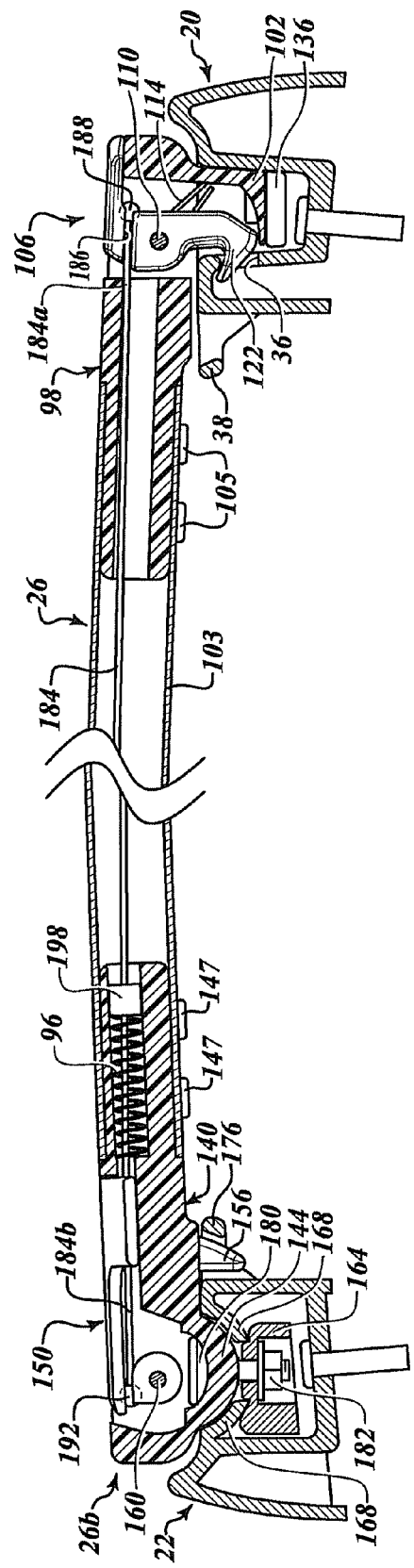
FIG. 17 is a view of the cross bar and support elements shown in FIG. 16 but with the locking members in their locked positions.

With brief reference to FIG. 9, a biasing element 92 is positioned over the pivot pin 88 and engages a surface 94 of the locking member 80 and an inner wall surface 96 of the end support component 72. The biasing element 92 operates to bias the jaw portion 84 of the locking member 80 into a locked normally locked position as shown in FIG. 17. In the stowed position, the jaw portion 84 engages the opening 40 in the support element 20.

Figure 10:
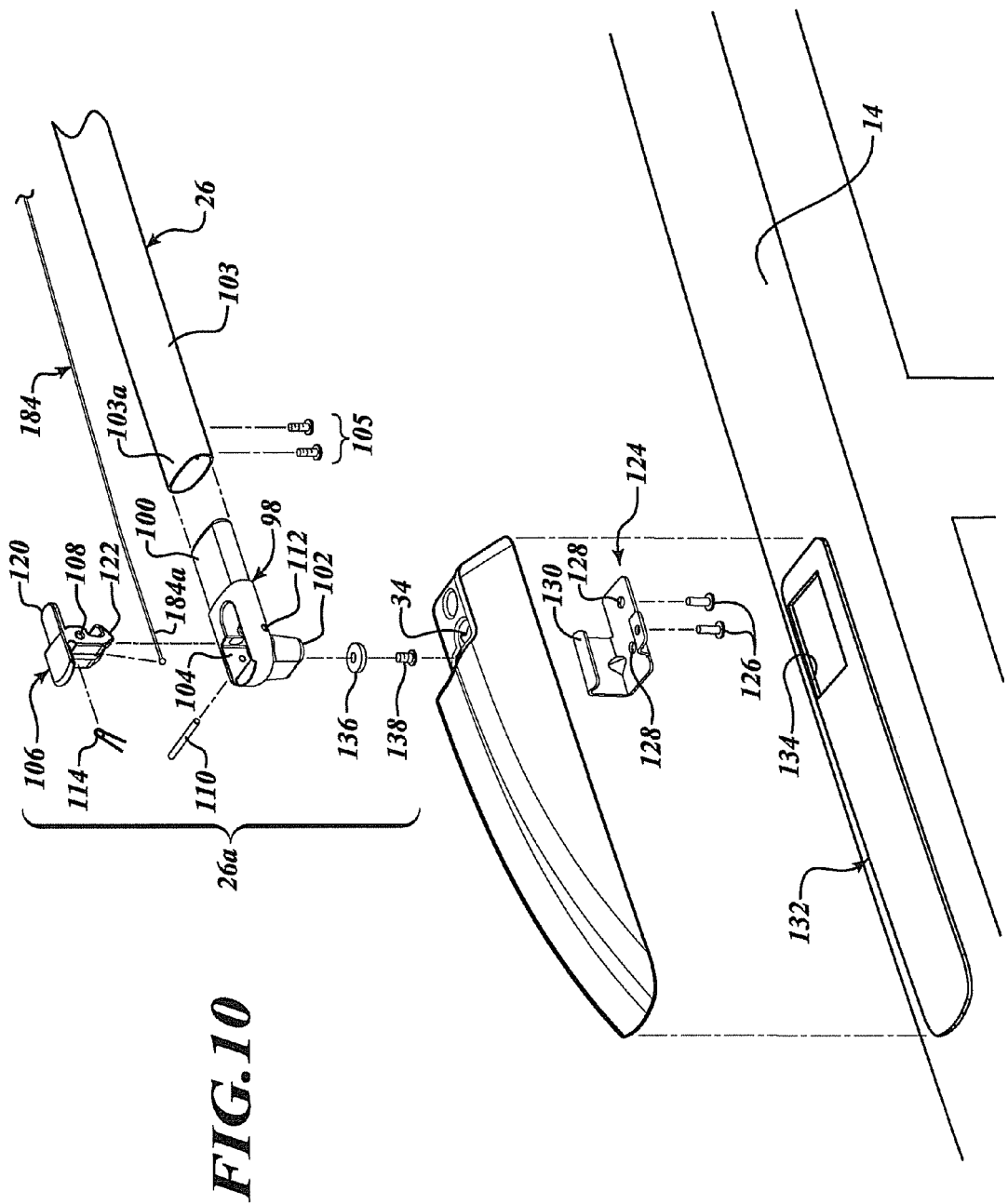
FIG. 10 is an exploded perspective view of the components at the first end of the rear cross bar.

With reference to FIG. 10, first end support 26a of the rear cross bar 26 is shown in greater detail. The first end support 26a includes an end support component 98 having a neck portion 100 and a base portion 102. The neck portion 100 may be inserted into an end 103a of a tubular cross bar component 103 and secured thereto via a plurality of conventional threaded fastening elements 105. The fastening elements 105 may extend through holes (not shown) in the cross bar component 103 and into threaded bores in the neck portion 100 of the end support component 98.

Figure 11:
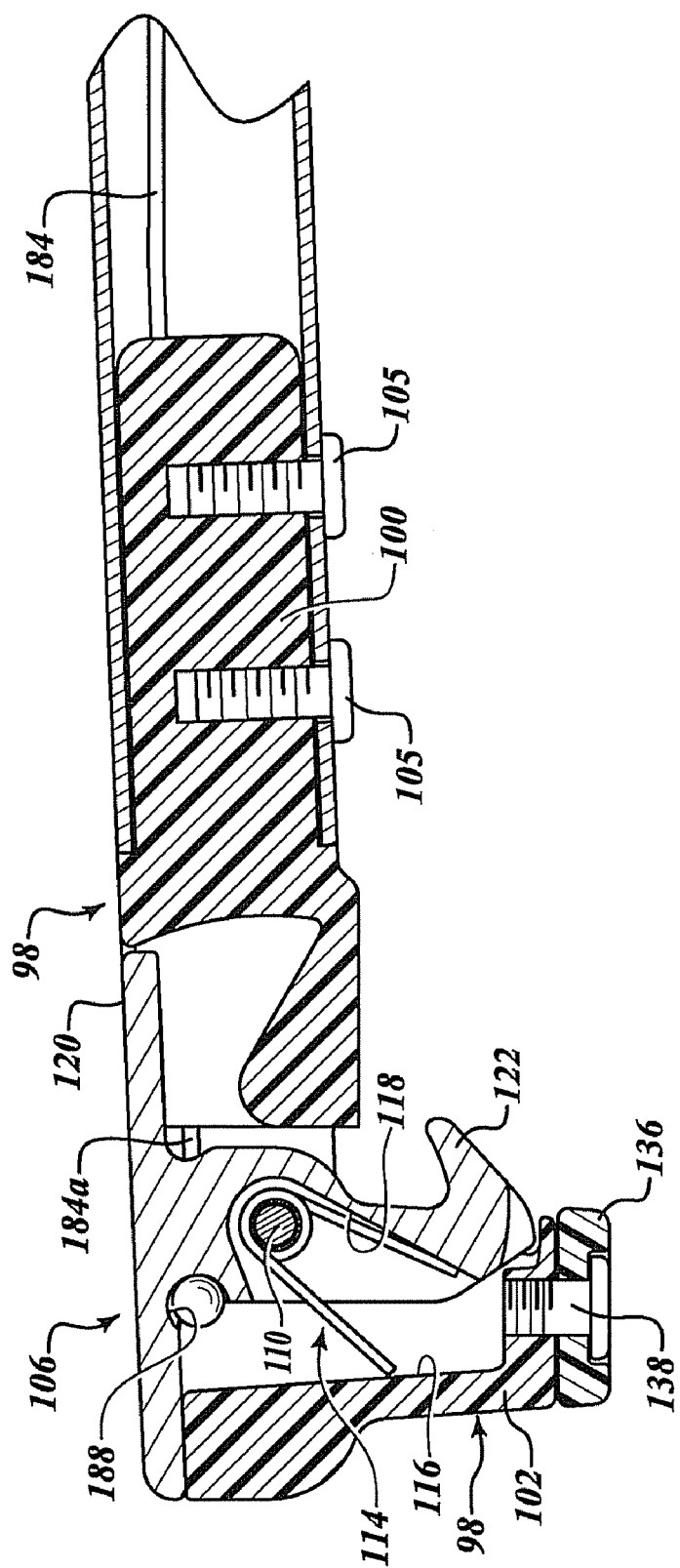
FIG. 11 is a cross sectional side view of the locking member mounted within the end support component of the end support shown in FIG. 10.

The base portion 102 of the end support component 98 includes an opening 104 within which is positioned a locking member 106. The locking member 106 includes a bore 108 that receives a pivot pin 110, with the pivot pin also extending through a bore 112 in the base portion 102 so that the locking member 106 is pivotally supported within the opening 104. With reference to FIG. 11, a biasing element 114 in the form of a torsion spring is positioned over the pivot pin 110 during assembly such that one leg abuts a surface 116 of the end support component 98 while the other leg of the biasing element 114 abuts an internal wall surface 118 of the locking member 106. This serves to continuously bias the locking member 106 into a normally locked position as shown in FIG. 17.

With further reference to FIGS. 10 and 11, the locking member 106 also includes a manually graspable portion 120 and a jaw portion 122. The user may grasp the manually graspable portion 120 to urge the locking member 106 into an unlocked position, to thus permit the end support 26a to be disengaged from the support element to which it is attached (i.e., either support element 18 or support element 20). The jaw portion 122 serves to lock the end support 26a to either one of the support elements 18 or 20.

With further reference to FIG. 10, a bracket 124 is positioned within the opening 34 and secured to the outer body surface 14 by a pair of conventional fastening elements 126 that extend through holes 128 in the bracket 124. The fastening elements 126 may be RIVNUT® fasteners or any other suitable fastening members. The bracket includes a lip 130 that the jaw portion 84 of the end support 24b can engage when the forward cross bar 24 is in its operative position and locked to the support element 18. A protective pad 132 is positioned on the outer body surface 14 to protect the surface. A cut-out 134 provides clearance for the bracket 124. The end support component 98 further includes a wheel 136 held to the base portion 102 by a threaded fastener 138 that engages a hole (not shown) in the base portion 102. The wheel 136 is able to rotate to help facilitate smooth sliding movement of the rear cross bar 26 when the end support 26a is engaged within the channel 42 of the rear support element 20.

Figure 12:
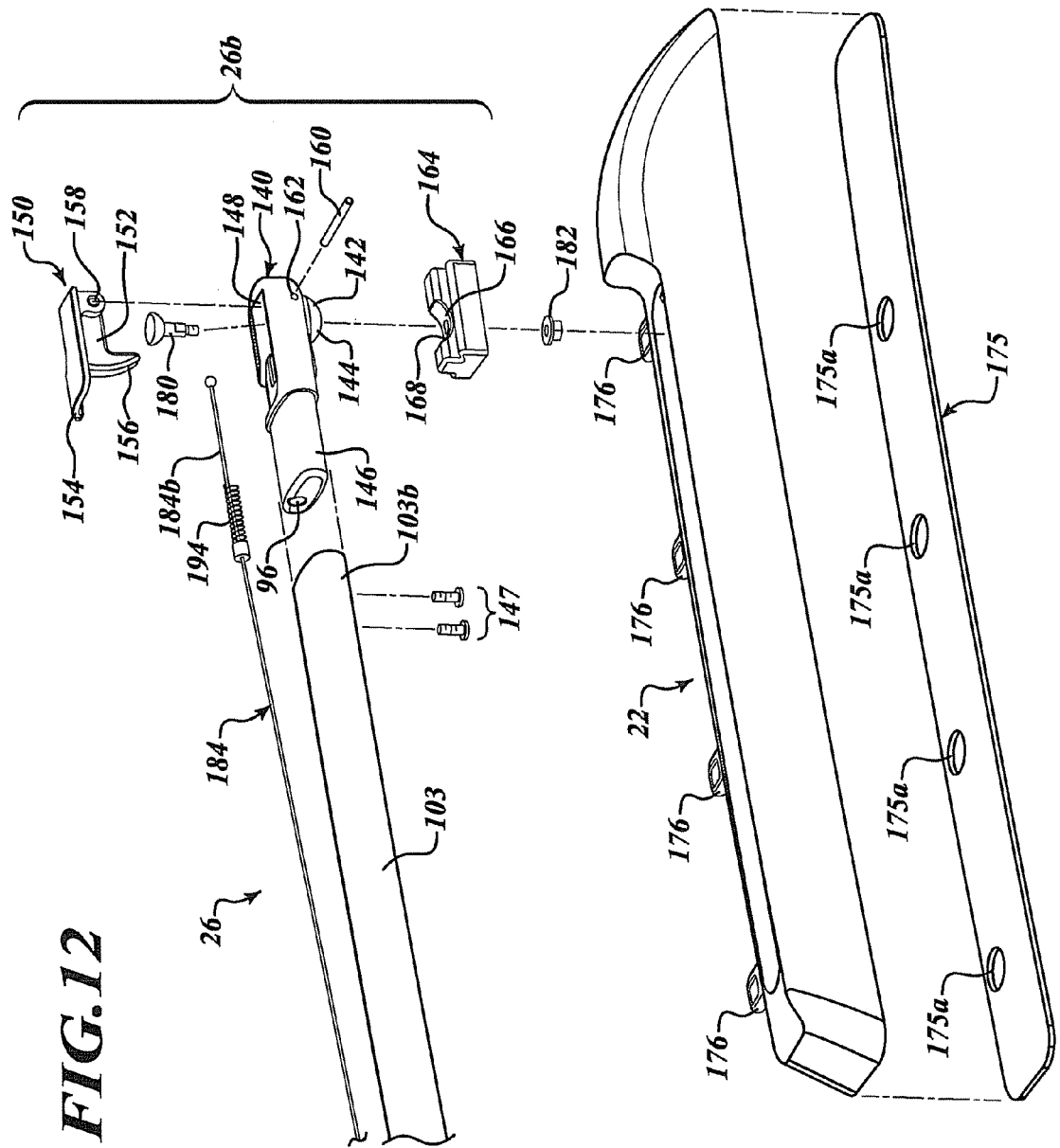
FIG. 12 is an exploded perspective view of the components at the second end of the rear cross bar and the second rear support element.

Referring now to FIG. 12, the construction of the end support 26b is shown in greater detail. The end support 26b includes an end support component 140 having a base portion 142, a spherical portion 144 and a neck portion 146. During assembly the neck portion 146 is inserted into an end 103b of the cross bar component 103. Conventional threaded fasteners 147 are inserted through holes in the cross bar component 103 and into threaded holes (not shown) in the end support component 140 to hold the end support component 140 securely to the cross bar component 103.

The end support 26*b* also includes an opening 148 within which a locking member 150 is positioned. The locking member 150 has a base portion 152, a manually graspable portion 154 and a jaw portion 156. The base portion 152 further includes a bore 158 through which a pivot pin 160 may be inserted. The pivot pin 160 also is inserted through a bore 162 in the end support component 140. Thus, the pivot pin 160 enables pivoting movement of the locking member 150 within the end support component 140.

With reference to FIGS. 12, 14, 15 and 16, the end support member 140 is also secured for pivoting movement by a mounting block 164 that is positioned within a channel 166 formed in the support element 22. The channel 166 has semi-circular wall portions 168 that help to support the spherical portion 144 of the end support component 140 when the end support component 140 is assembled thereto. Openings 170 allow the mounting block 164 to be inserted into the channel 166. The support element 22 includes a plurality of bottom wall portions 172 (FIG. 14) that each have a hole 174 therein. Conventional fasteners, for example RIVNUT® fasteners, may be inserted through the holes 174 when fastening the support element 22 to the outer body surface 14 of the vehicle 12. Securing loops 176 enable the jaw portion 156 of the locking member 150 to be engaged therein to secure the rear cross bar 26 against longitudinal movement when it is in its operative configuration. A rubber mounting pad 175 or other suitable protective form of pad may be disposed between the support element 22 and the outer body surface. Holes 175*a* permit fasteners, such as RIVNUT® fasteners, to extend through the mounting pad 175.

Figure 13:
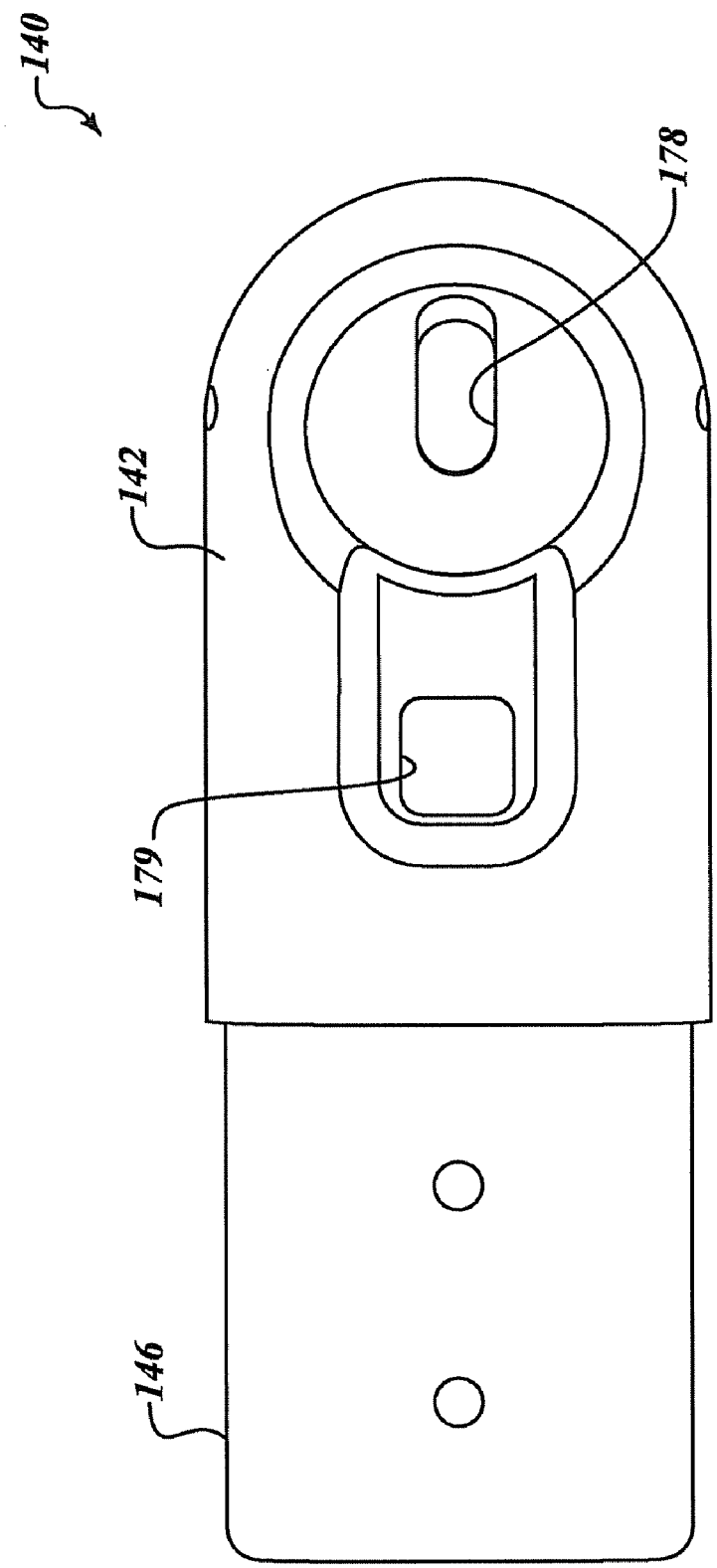
FIG. 13 is a bottom view of the end support component shown in FIG. 12.

With reference to FIGS. 12 and 13, the end support component 140 also includes a slot 178 that receives a partially threaded shaft of a retaining member 180. An opening 179 allows the jaw portion 156 of the locking member 150 to project therethrough. A fastener 182, either being threaded or press fit on to the shaft of the retaining member 180, secures the end support component 140 to the mounting block 164 after the mounting block 164 has been positioned within the channel 166 of the support element 22. The slot 178, together with engagement of the spherical surface 144 and the mounting surface 166, permits the rear cross bar 26*b* to be lifted at end support 26*a* as well as pivoted between its stowed and operative positions. The use of the slot 178 is highly advantageous because it enables the end support 26*a* to be lifted and lowered as the end support 26*a* is coupled to, or de-coupled from, either of the support elements 18 or 20, and thus eliminates any clearance issues that would otherwise exist when moving the end support 26*a* between the two support elements 18 and 20.

Figure 14:
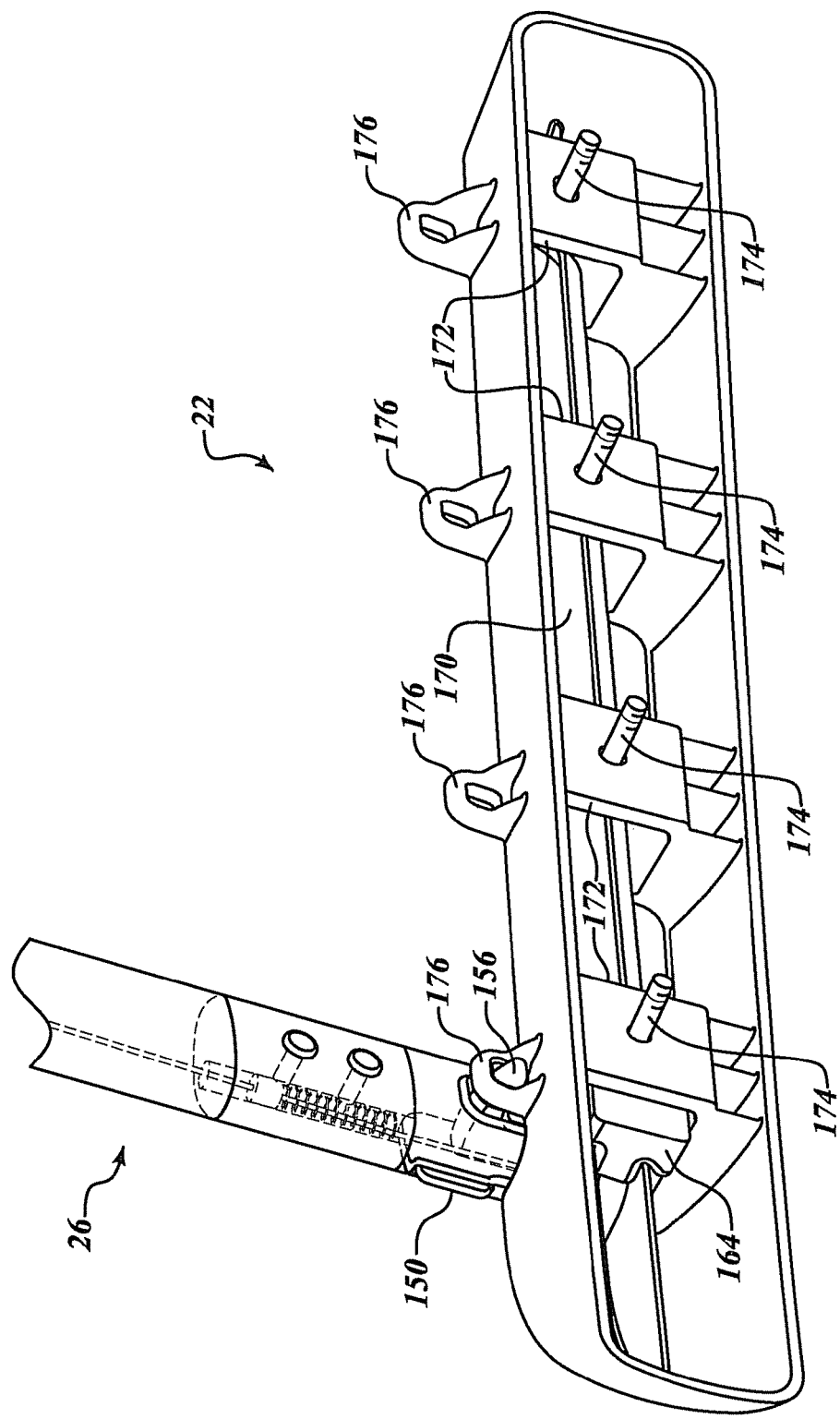
FIG. 14 is a bottom perspective view of the second end of the rear cross bar engaged with the second rear support element.
Figure 15:
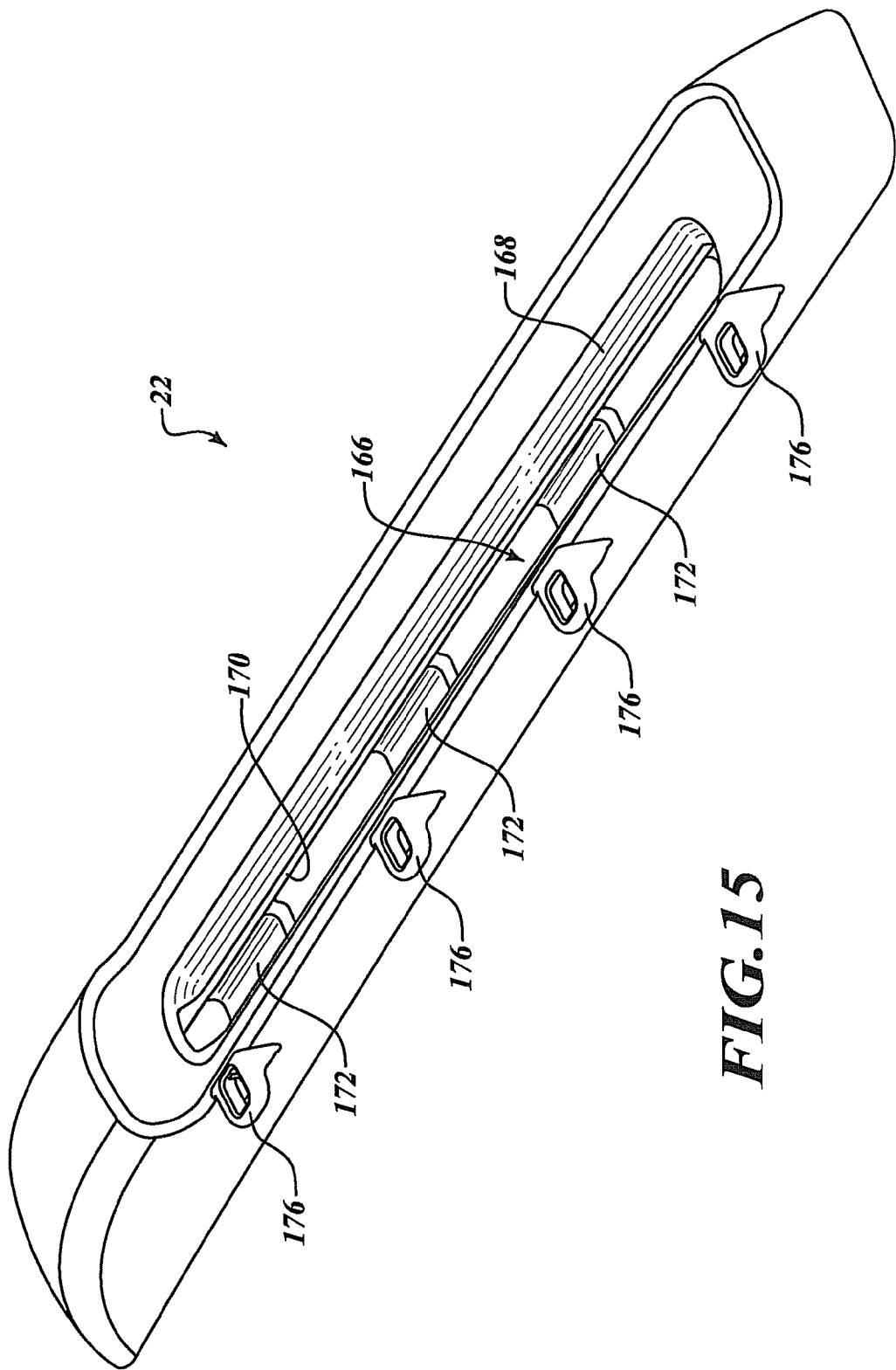
FIG. 15 is an enlarged perspective view of the second rear support element.
Figure 16:
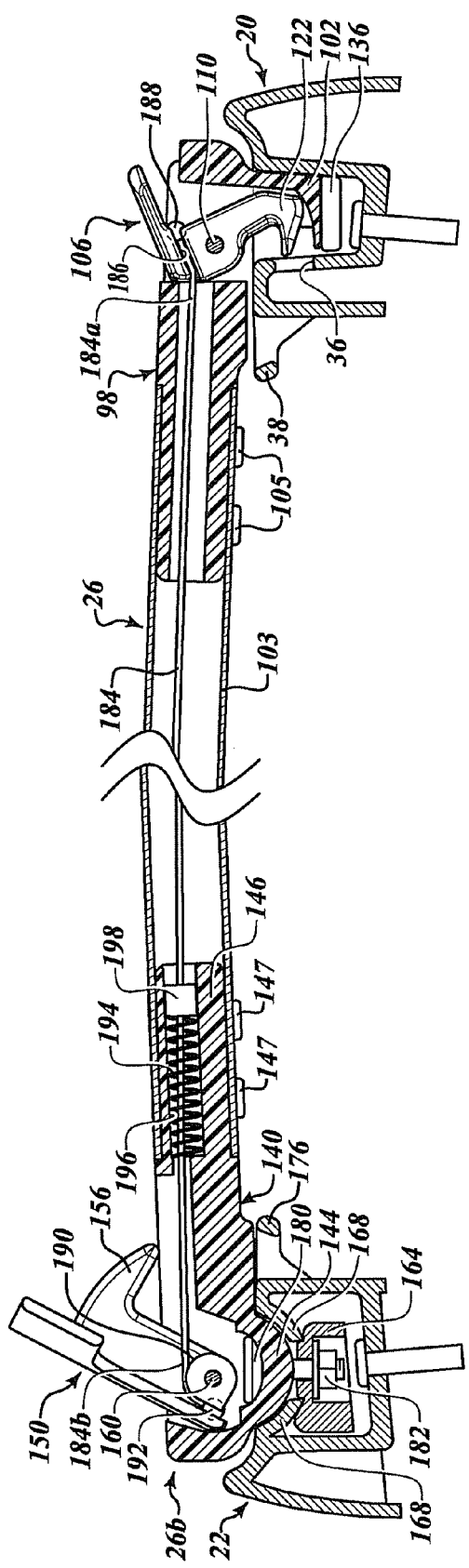
FIG. 16 is a cross sectional side view of the rear cross bar and the two rear support elements, with the locking members of the rear cross bar in their unlocked positions.

With further reference to FIGS. 14-16, the mounting block 164 is dimensioned such that it is able to slide within the channel 166 of the support element 22 without requiring any detachment of the rear cross bar 26 from the support element 22. Thus, the rear cross bar 26 can with be moved longitudinally and re-positioned along the rear support elements 20 and 22 if needed. In this example, the securing loops 38 and 176 define four distinct longitudinal positions at which the rear cross bar 26 can be secured.

Referring further now to FIGS. 10, 12, 16 and 17, a cable 184 has a first end 184*a* secured to the locking member 106 of end support 26*a*. The cable 184 may be made from steel or possibly from nylon or other suitably strong materials. The first end 184*a* is supported within a channel 186 in the locking member 106, and an enlarged head portion 188 of the cable 184 prevents the cable from being withdrawn from the locking member 106. Second end portion 184*b* of the cable 184 extends over an arcuate shoulder 190 in the locking member 150, and an enlarged head portion 192 prevents the cable 184 from being withdrawn from the locking member 150. A biasing element in the form of a coil spring 194 is positioned within a blind bore 196 in the neck portion 146 of the end support component 140. The biasing element 194 abuts a block 198 (FIGS. 16 and 17) that is crimped on or otherwise fixedly secured to the cable 184 so that it can exert tension on the cable that serves to help maintain the locking members 106 and 140 in their normally locked positions (FIG. 16).

Figure 19:
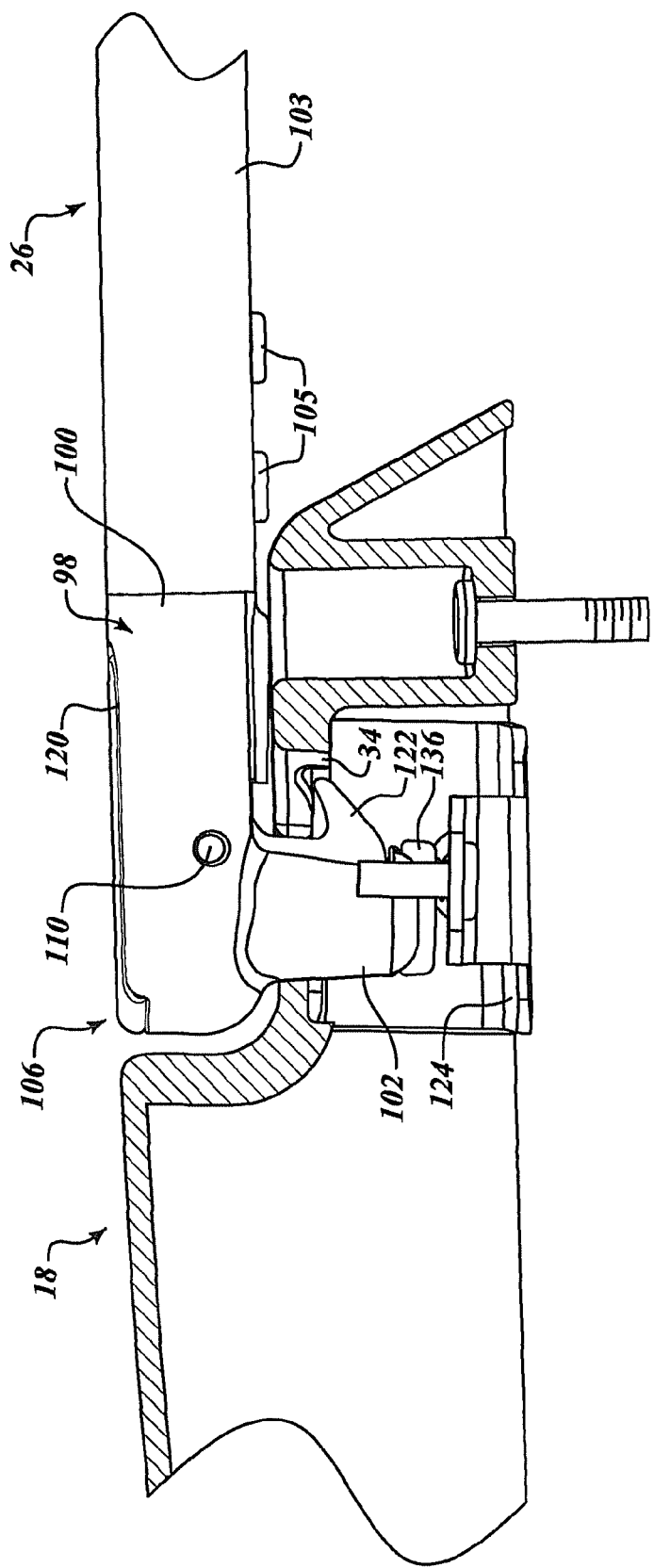
FIG. 19 is a side partial cross sectional view of the first end support of the rear cross bar engaged with the second one of the forward support elements.

Referring further to FIGS. 16 and 17, when the rear cross bar 26 is to be moved between its operative and stowed configurations, or when it is to be repositioned longitudinally along the two rear support elements 20 and 22, a user may manually grasp the manually engageable portion 120 or 154 of either of locking members 106 and 150, respectively, and lift upwardly away from its associated end support component 98 or 140, respectively. Cable 184 simultaneously causes pivoting of the other one of the locking members 106 or 150 into an unlocked position. While holding the selected locking member 106 or 150 in a lifted position, such as shown in FIG. 16, the entire rear cross bar 26 can be moved slidably along the rear support elements 20 and 22 to a new position defined by a different pair of the securing loops 38 and 176. Alternatively, the rear cross bar 26 could be pivoted from its operative position to its stowed position with end support 26*a* positioned on support element 18, as shown in FIG. 19. In this position the hook portion 122 of end support component 106 engages the opening 34 of the forward support element 18. In either instance, the user is able to unlock and lock both end supports 26*a* and 26*b* from the support elements 20 and 22 from one side of the vehicle 12. This eliminates the need for the user to walk back and forth between both sides of the vehicle 12 to accomplish repositioning of the rear cross bar 26, or when moving the rear cross bar 26 between its stowed and operative positions. This significantly adds to the ease and convenience in using manipulating the rear cross bar 26.

Figure 18:
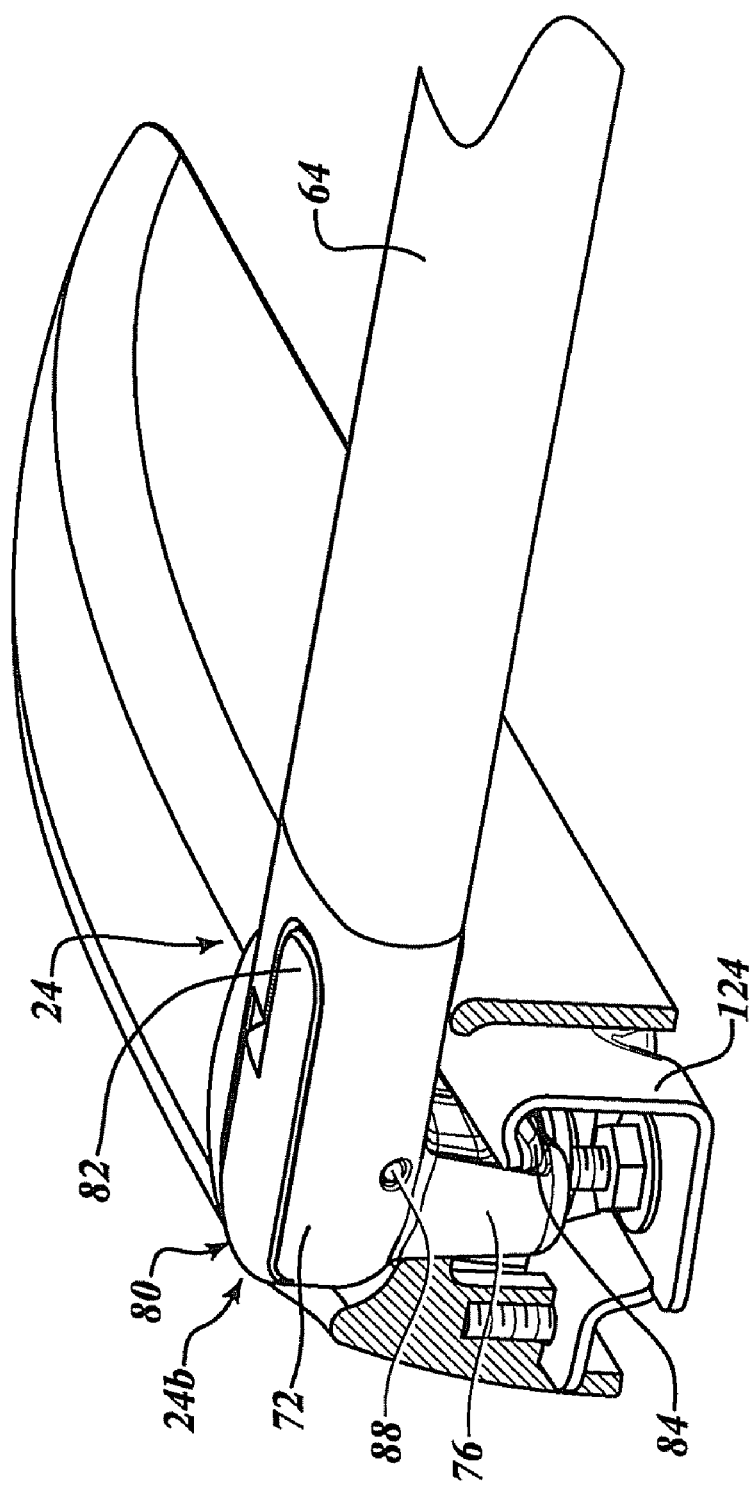
FIG. 18 is a perspective, cross sectional view of the second end support of the front cross bar engaged with the second one of the forward support elements.

Referring to FIG. 18, when the front cross bar 24 is in its operative position, jaw portion 84 of locking member 80 extends through the opening 34 in the support element 18 to engage with flange 130 of the bracket 124 (the flange 130 also being visible in FIG. 10). When the rear cross bar 26 is in its stowed position, the locking member 106 of end support 26*a* extends through opening 34 to engage the support element 18 (FIG. 19). In their stowed positions, the cross bars 24 and 26 form a sleek, aesthetically pleasing component that bridges support element pairs 16,20 and 18,22. Stowing the cross bars 24 and 26 also helps to even further improve the aerodynamic characteristics of the vehicle article carrier 10. A particular advantage is that stowing of the cross bars 24 and 26 can be accomplished without any disassembly of the end supports 24*a*,24*b*,26*a* and 26*b* from any of the support elements 16, 18, 20 and 22. Furthermore, no external tools are required to reposition the cross bars 24 and 26 in their stowed positioned or to move them from their stowed positions back into their operative positions.

From FIG. 3, it will also be apparent that in this example, the outer body surface 14 of the vehicle 12 is slightly wider at a forward portion of the vehicle 12*a* than at a rearward portion 12*b*. However, the channels 42 and 166 in the support elements 20 and 22, respectively, have been formed slightly non-parallel to outermost edges 200 and 202 of the rear support elements 20 and 22. This enables the support elements 20 and 22 to be mounted generally parallel to the longitudinal side edges of the outer body surface 14, while the channels 42 and 166 are maintained parallel to one another. The parallel positioning of the channels 42 and 166 enables the end supports 26a and 26b to be moved slidably along the channels 42 and 166 without binding. Furthermore, the slightly wider spacing of the forward support elements 16 and 18 means that the distance between the openings 28 and 34 will be slightly greater than the distance between the channels 42 and 166. To account for this, the overall length of the front cross bar 24 is just slightly longer than overall length of the rear cross bar 26. This also results in the longitudinal spacing between recess 28 in front support element 16 and opening 40 in the rear support element 20 being slightly greater than the spacing between the opening 34 in front support element 18 and the rearward most securing loop 176a. Of course, if the spacing between the front support elements 16,18 and the spacing between the rear support elements 20,22 is the same, then the overall lengths of the cross bars 24 and 26 may be the same, which would also obviate the need to make the spacing between the end support securing points on the support element pairs 16,20 and 18,22 different.

The end support components 98 and 140, as well as the locking members 106 and 150 may be made from high strength plastics or any other suitable strong and durable materials. The support elements 16-22 may also be made from high strength plastic, aluminum or any other suitably strong and durable materials.

Referring now to FIG. 200, a vehicle article carrier system 200 in accordance with another aspect of the present disclosure is shown. The vehicle article carrier 200 is secured to an outer body surface 202 of a vehicle 204 such as a sport utility vehicle (SUV), van, station wagon, crossover, sedan or truck, or virtually any other vehicle where the need to carry articles on top of the vehicle exists. The system 200 may be comprised of a pair of support rails 206 that are fixedly secured to the outer body surface 202 by any suitable means, for example by RIVNUT® style fasteners. The support rails 206 are secured parallel to one another to extend parallel to the major longitudinal axis of the vehicle 204. One or more cross bars 208 are included, but in most applications it is anticipated that two cross bars 208 will be employed with the system 200. Each cross bar 208 includes an end support 210 at each opposing end of a cross bar member 212.

Figure 20:
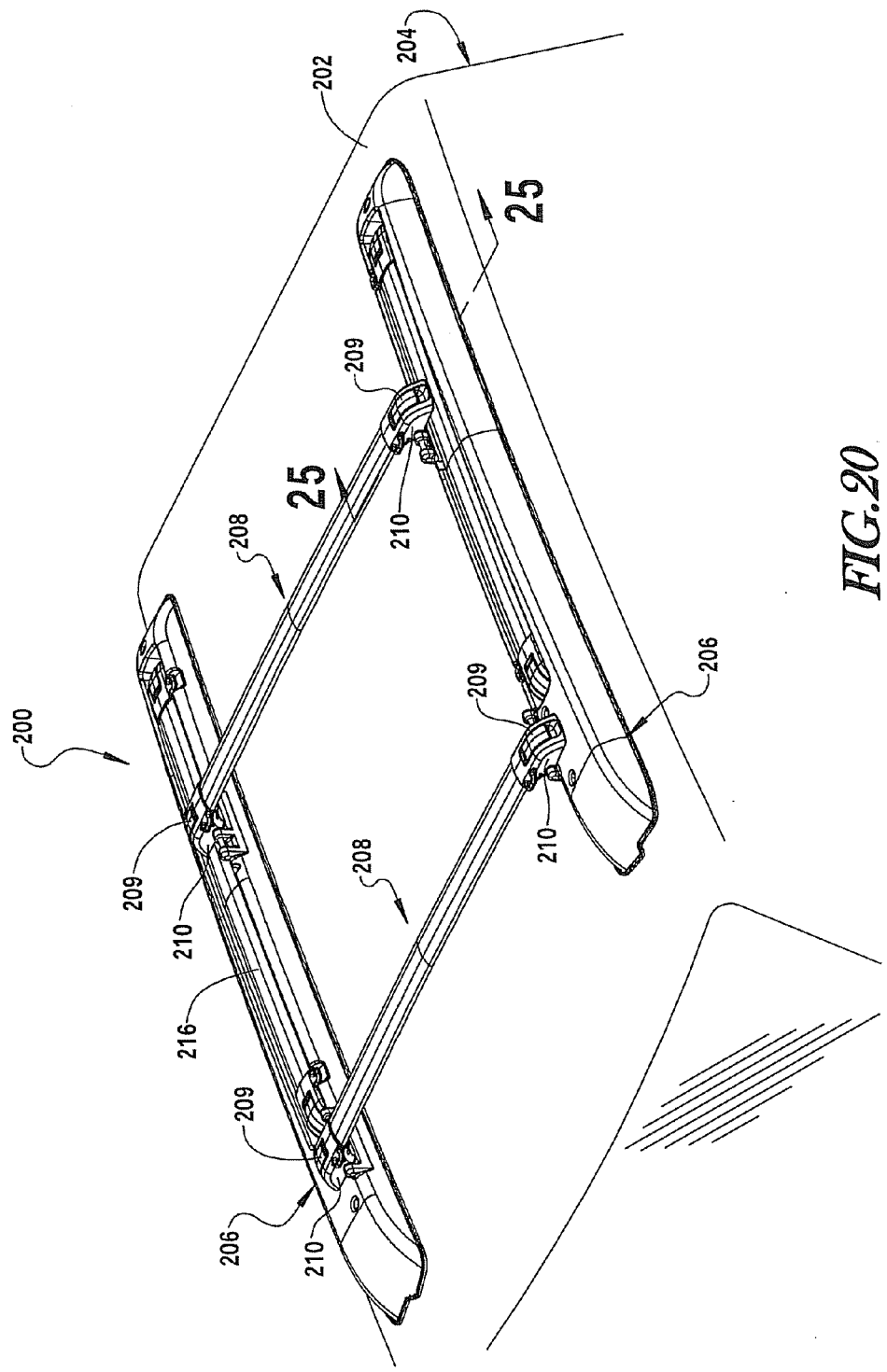
FIG. 20 shows a perspective view of another embodiment of a vehicle article carrier system in accordance with the present disclosure, with the vehicle article carrier system secured to an outer body surface of a vehicle.
Figure 21:
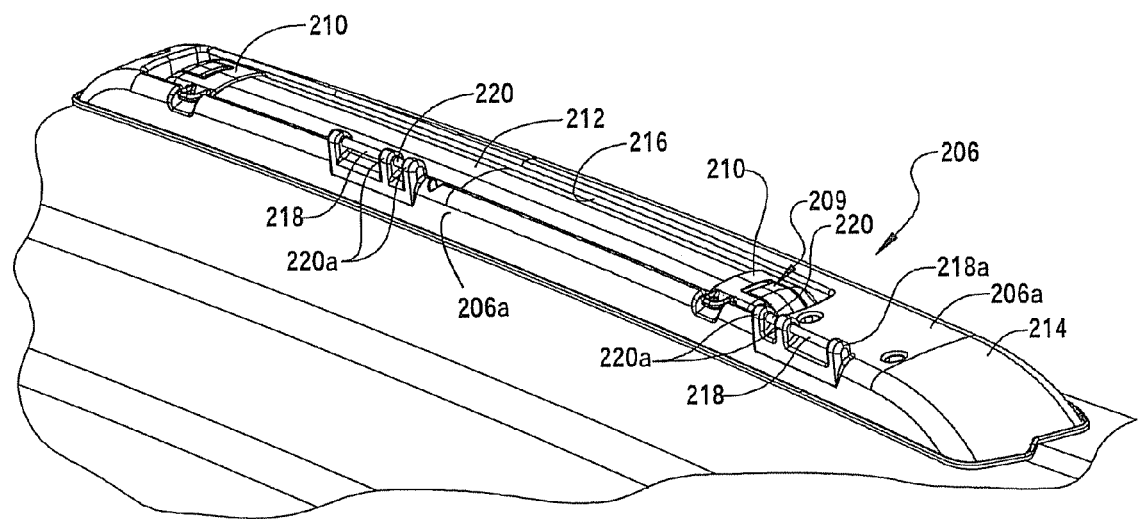
FIG. 21 shows an enlarged perspective view of one of the support rails of the system.

With reference to FIG. 21, one of the support rails 206 can be seen in even greater detail. The two support rails 206 shown in FIG. 20 are symmetrical and mechanically identical in construction. As such, only one of the support rails 206 will be described in detail, with it being understood that the following description applies equally to the other support rail 206. The support rail 206 includes a frame portion 214 having an elongated recess 216 extending longitudinally along the frame portion 214. The elongated recess 216 provides a space for storing its associated cross bar 208 when the cross bar is in its stowed position. The support rail 206 also includes a pair of primary locking bars 218 formed along inside, longitudinal edge 206a of the support rail 206, parallel to the inside edge, and so as to be elevated above the inside edge 206a. The primary locking bars 208 are further located at points along the frame portion 214 that space the cross bars sufficiently apart, when the cross bars 208 are in their operative positions, to optimally support articles above the outer body surface 202. The end supports 210 of each cross bar 208 include a locking assembly 209 that can be locked to the locking bars 218 to secure the cross bars in their operative positions. In their operative positions the cross bars 208 are positioned slightly above the support rails 206, while in their stowed positions, the support rails are positioned in the elongated recesses so that they rest generally flush with the upper surface 206a of their respective support rail 206.

With further reference to FIG. 21, a portion 220 of locking bar 218 may be separated by a pair of integrally formed mounting shoulders 220a to form a tie down area where bungee cords and other like securing implements, typically used to fasten articles to an article carrier system, may be secured at to help secure articles being supported on the system 200. While only two die down areas 220 have been shown on the support rail 206, it will be appreciated that a greater or lesser number of such tie down areas could be employed. Also, the tie down areas need not be disposed immediately adjacent the locking bars 218, although the presently disclosed arrangement allows the tie down areas to be formed by simply using a portion of each of the locking bars 218. If separate locking bar elements are employed, then the tie down elements could be positioned at other locations along the support rails 206. Each locking bar 218 is formed by one mounting shoulder 218a and one of the mounting shoulders 220a. The locking bars 218 may be insert molded during the manufacture of each support rail 216 or alternatively may be inserted into suitably formed bores in the mounting shoulders 218a and 220a and held therein with fixedly secured end caps. The manufacture may consist of molding a suitable high strength plastic in a conventional molding operation to form the support rails 206.

Figure 22:
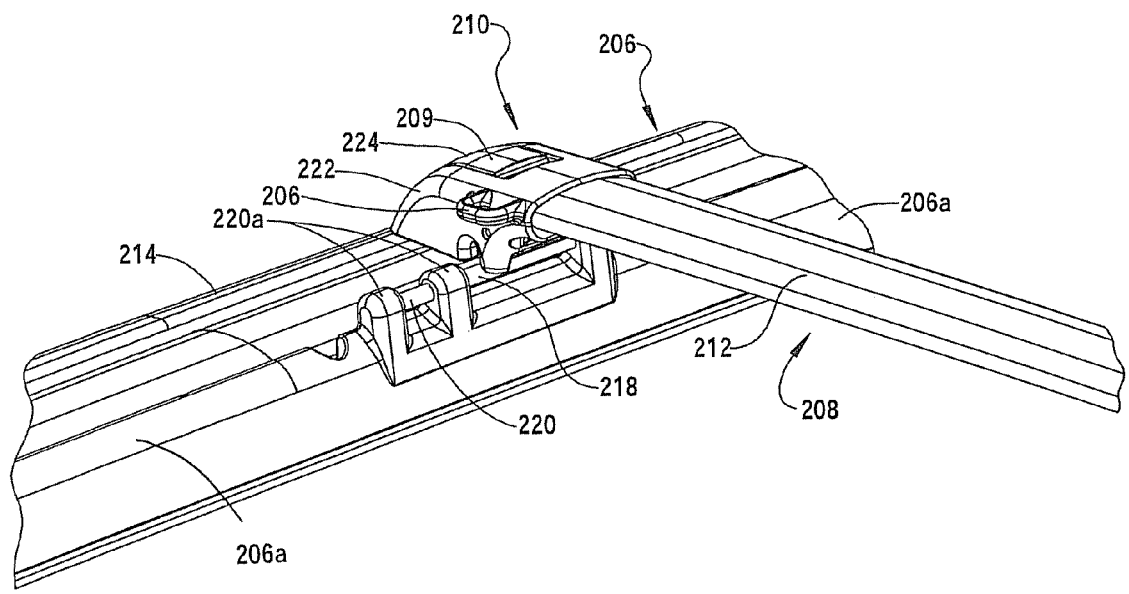
FIG. 22 shows an enlarged view of one of the cross bars of the system about to be attached to a mounting bar of one of the support rails to place the cross bar in its operative position.

Referring to FIG. 22, an enlarged illustration of one of the end supports 210 is shown. The end support 210 includes a housing 222 that houses the locking assembly 209. The locking assembly may include a manually graspable actuating member 224 that may be grasped with one or more fingers of an individual, and rotated, to latch and unlatch the end support 210 from its respective support rail 206. The housing 222 may also include one or more integrally formed tie down loops 226 for use with external bungee cords and like securing implements.

Figure 23:
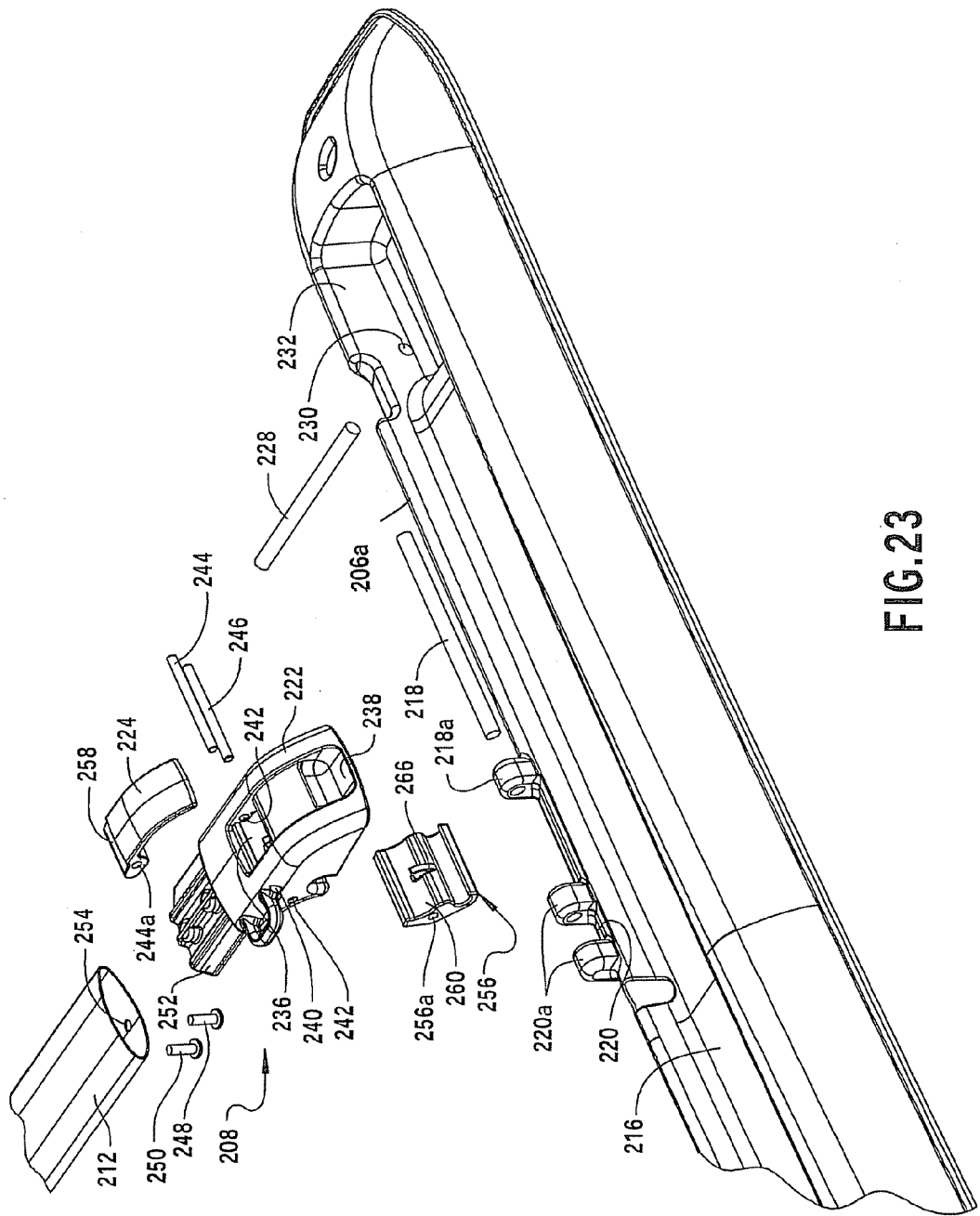
FIG. 23 shows an exploded perspective view of one of the end support assemblies and an exploded perspective view of a portion of one of the support rails of the system.
Figure 24:
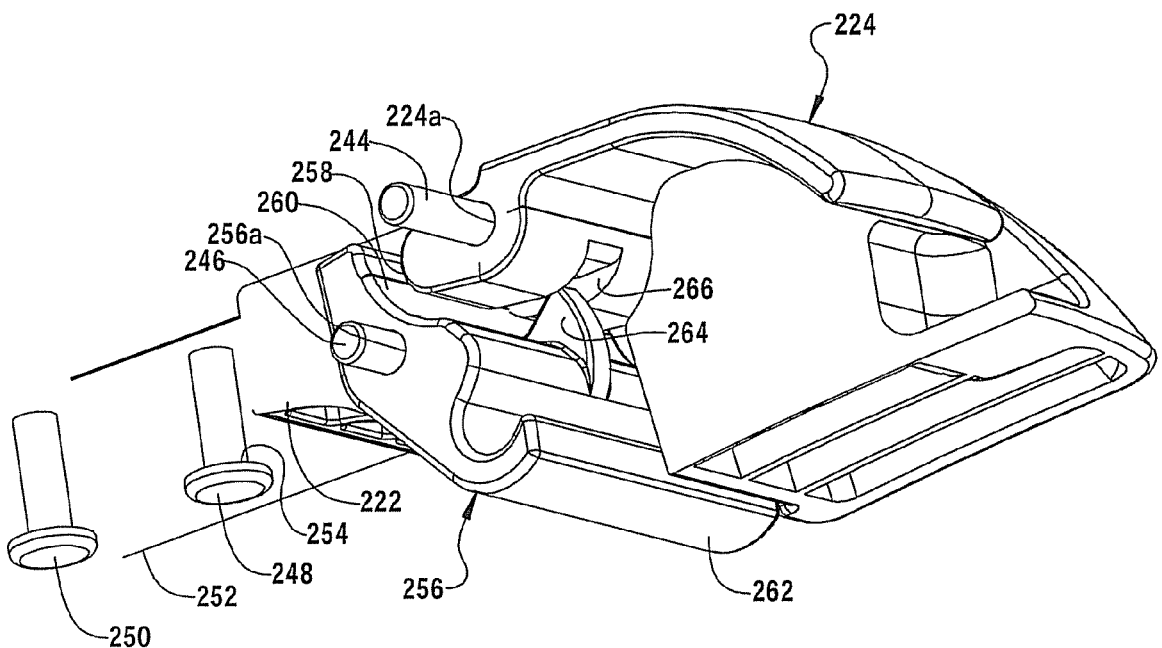
FIG. 24 is a perspective view of just the actuating member and the locking element positioned adjacent one another.

Referring to FIGS. 23 and 24, the construction of the end support 210 and the support rail 206 can be seen in greater detail. The support rail 206 also includes a pair of secondary locking bars 228 (only one being visible in FIG. 23). Each secondary locking bar is secured within a hole 230 extending transversely through a pocket 232. A second blind hole (not shown) may be formed in the frame 216 and aligned with hole 230 to receive the secondary locking bar 228. The pocket 232 is formed at one end of the elongated recess 216. Another pocket (not shown) identical to pocket 232 is formed at the opposite end of the elongated recess 216 where the second one of the secondary locking bars 228 is located. The pockets 232 provide extra relief for the end supports 210 so that the entire cross bar 208 rests with its upper surface substantially flush with the upper surface 206a of the support rail 106, as shown in FIG. 21. In FIG. 21 the locking assembly 209 of each end support 210 is engaged with the secondary locking bars 228 on one of the support rails 206 when the cross bar 208 is in its stowed position. The locking assembly 209 of each end support 210 is engaged with a locking bar 218 on each of the two support rails 206 when the cross bar 208 is in its operative position, as shown in FIG. 20.

Referring further to FIGS. 23 and 24, the end support 208 can be seen to include the housing 222 which has an opening 236 and a recess 238 formed therein adjacent one another. The housing 222 also includes two pairs of openings 240 and 242 that are used to receive and support two press fit pivot pins 244 and 246, respectively. Pivot pin 244 may extend through a bore 224a in the actuating member 224 to pivotally support the actuating member within the housing 222. Conventional threaded fasteners 248 and 250 may be used to secure a neck portion 252 of the housing 222 to an end of the cross bar member 212 via one or more holes 254. The end support 210 further includes the actuating member 224 and a locking element 256. The locking element 256 is pivotally supported by the pivot pin 246, which extends through a bore 256a in the locking element. With specific reference to FIG. 24, the actuating member 224 can be seen to include a camming surface 258, while the locking element 256 includes a cam follower surface 260 and a locking hook portion 262. A projection 264 extends from a surface of the locking element 256, and the actuating member 224 includes a notch 266 having a width sufficient to receive the projection 264. Collectively the actuating member 224 and the element 256, and their associated pivot pins 244 and 246, may form the locking assembly 209 of the end support 210.

Figure 25:
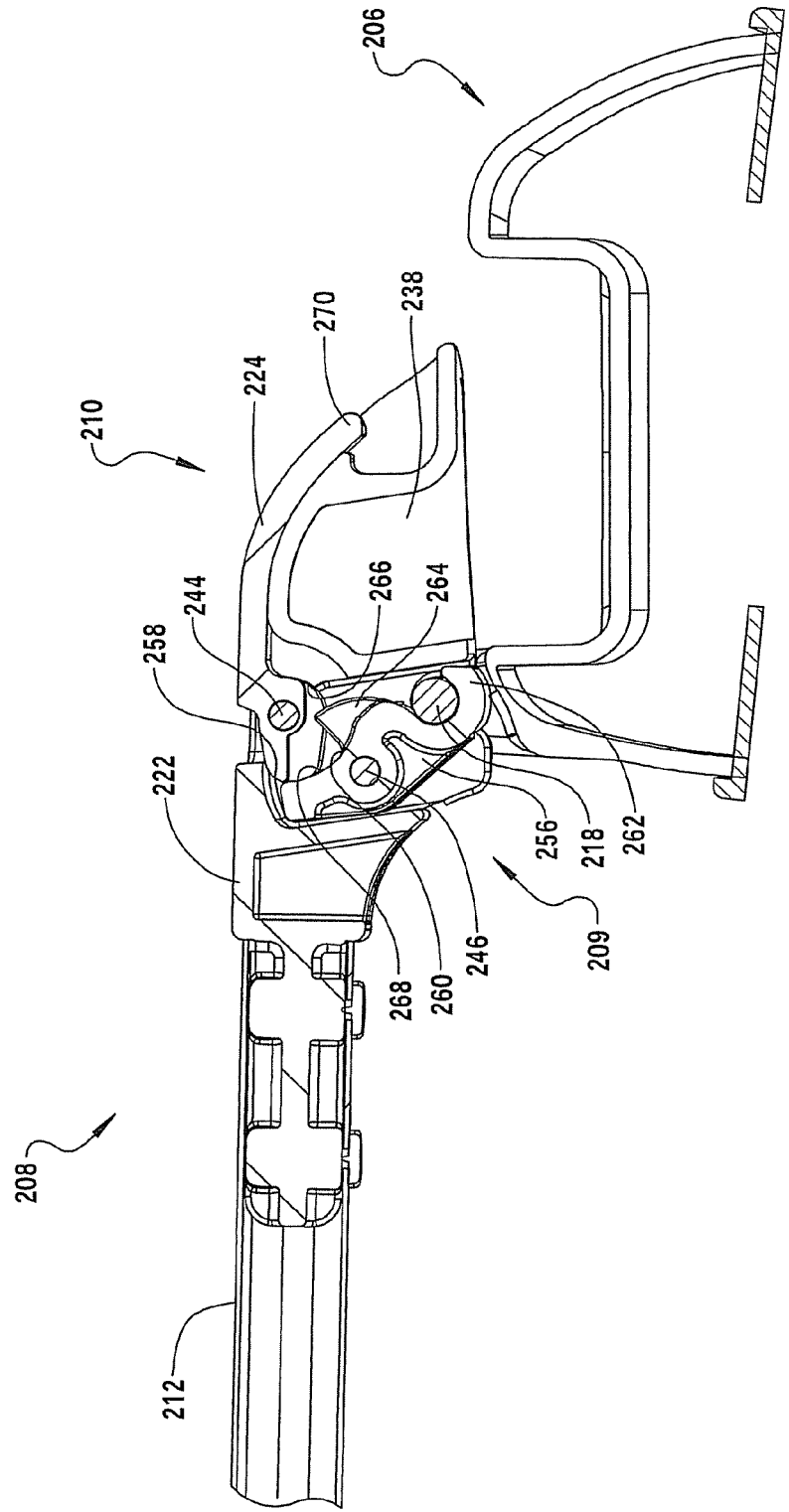
FIG. 25 shows a side cross-sectional view of the end support taken in accordance with section line 25-25 in FIG. 20, showing the end support in the closed position attached to one of the mounting bars of the support rail.
Figure 26:
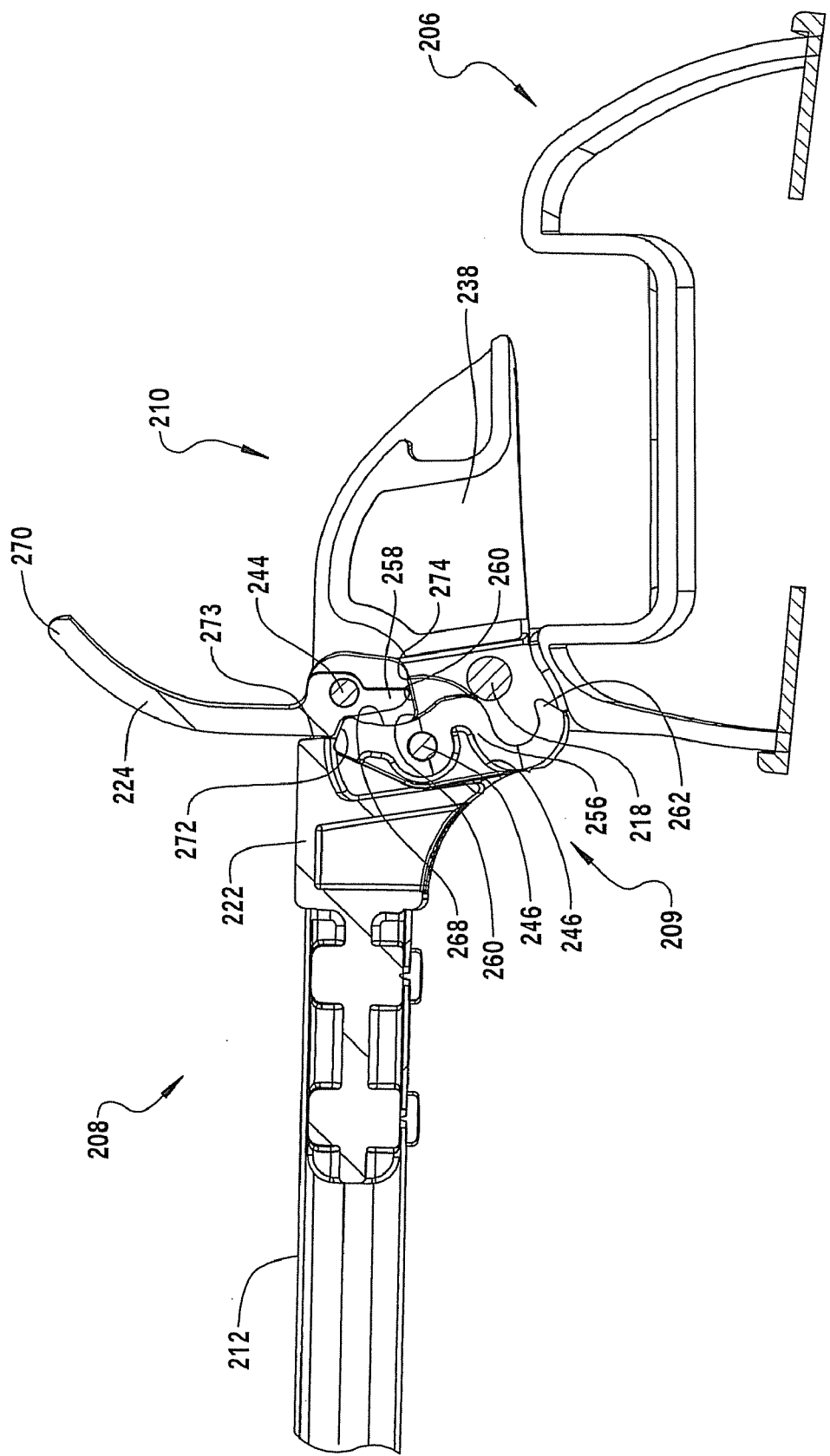
FIG. 26 shows the end support of FIG. 25 in its open position.

Referring now to FIGS. 25 and 26 the end support 210 is shown in its latched position (FIG. 25) and its unlatched position (FIG. 26). In the latched position the camming surface 258 of the actuating member 224 is disposed in contact with the distal portion 268 of the locking element 256 camming surface 260. The actuating member 224 is maintained in its closed position by the over center biasing pressure exerted by the actuating member 224 on the distal portion 268 of the locking element 256, as a result of contact of the hook portion 262 with the mounting bar 218. Thus, FIG. 25 depicts the end support 210 in its operative or latched position.

To unlock the end support 210, the user lifts upwardly on the actuating member 224 at its edge portion 270 using one or more fingers. Sufficient force is required to overcome the over center biasing force that is maintaining the actuating member 224 in its closed position. As the user grasps edge portion 270 and begins to lift upwardly in the drawing of FIG. 25, this rotates the actuating member 224 in a counter-clockwise direction about pivot pin 244. At a predetermined point of travel, the camming surface 258 moves past its over center position and the actuating member 224 then moves forcibly by the over center biasing force into its unlatched position shown in FIG. 26. Simultaneously, the locking element 256 is moved clockwise about pivot pin 246 by the actuating member 224. This causes the hook portion 262 of the locking element 256 to disengage the mounting member 218. Surface 272 of the actuating member 224 and surface 273 of the housing 222 cooperatively provide a positive stop that prevents the actuating member 224 from rotating past an approximate vertical position during its unlatching, counter clockwise movement. In the unlatched position the camming surface 258 is in contact (i.e., under compression) with edge portion 274 of the cam follower surface 260. Interior surface 276 of the end support housing 222 also helps to prevent further clockwise rotational movement of the locking element 256 once it is moved into the position shown in FIG. 26. When both of the end supports 210 are in the open position shown in FIG. 26, their associated cross bar 208 can be lifted upwardly off of the support rails 206 and repositioned as needed (i.e., either in the operative or stowed positions).

The system 200 provides a low profile, highly aerodynamically efficient and highly aesthetically pleasing appearance when the cross bars are in their stowed positions. Moving the cross bars 208 from the stowed to the operative positions, or from the operative to the stowed positions, requires no external tools and can be done in just seconds by the user. Since the locking element 256 of each end support 210 operates to lock its associated cross bar 208 in both the stowed and operative orientations, no separate locking element is required to lock the cross bar in its stowed orientation. This results in the system 200 being highly cost and parts efficient from a manufacturing standpoint.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system comprising:
   a pair of support rails;
   at least one cross bar having an end support at each opposing end thereof;
   each of said support rails including an elongated recess extending parallel to a longitudinal axis thereof, said elongated recess being shaped generally in accordance with said cross bar, for receiving said cross bar when said cross bar is placed in a stowed orientation;
   each of said support rails further including at least one primary locking bar disposed along and parallel with an inside longitudinal edge of its respective said support rail, and further such that the primary locking bar protrudes at least slightly above the inside longitudinal edge, for supporting said cross bar in an operative position extending generally perpendicularly between said support rails;
   each of said support rails further including at least a pair of secondary locking bars for supporting said cross bar in said elongated recess when said cross bar is placed in said stowed orientation in one of said support rails, and primary and secondary locking bars being arranged generally perpendicular to one another; and
   each of said end supports including a locking assembly for securing said cross bar to either one of said primary or secondary locking bars, to thus place said cross bar in either said operative position or said stowed position.

2. The system of claim 1, wherein said locking assembly includes a user graspable actuating member for placing its associated said end support in an unlatched condition and in a latched condition.

3. The system of claim 2, wherein said locking assembly further comprises a locking element in communication with said actuating member, and moveable by said actuating member between a first position, where said locking element is engaged with one of said primary or secondary locking bars, and a second position wherein said locking element is disengaged from primary or secondary locking bars and able to be removed from either of said support rails.

4. The system of claim 3, wherein said actuating member includes a camming surface and said locking element includes a cam follower surface, said camming surface adapted to engage said cam follower surface when moving said actuating member between open and closed positions.

5. The system of claim 4, wherein said locking element includes a hook portion for engaging with one of said primary or secondary locking elements.

6. The system of claim 1, wherein each of said elongated recesses includes a pair of spaced apart pockets for housing said end supports therein when said cross bar is placed in said stowed orientation.

7. The system of claim 1, further comprising an additional cross bar having an additional pair of end supports, said additional pair of end supports being engageable with said secondary locking bars when said additional cross bar is placed in said stowed orientation, and said additional pair of end supports being engageable with one of each of said primary locking bars on each of said support rails.

8. The system of claim 1, wherein each said end support includes a housing having a tie down loop for enabling external article fastening straps to be secured thereto.

9. A vehicle article carrier system comprising:
a pair of support rails fixedly secured to an outer body surface of a vehicle;
a pair of cross bars each having opposing ends, with each said opposing end including an end support;
each of said support rails including an elongated recess extending parallel to a longitudinal axis thereof, said elongated recess being shaped generally in accordance with said cross bar, for receiving an associated one of said cross bars when said associated one of said cross bars is placed in a stowed orientation, and such that an upper surface of said associated one of said cross bars is generally flush with an upper surface of its associated said support rail;
each of said support rails further including a pair of spaced apart primary locking bars, each said primary locking bar being disposed along and parallel with an inside longitudinal edge of its respective said support rail, and further such that each said primary locking bar protrudes at least slightly above the inside longitudinal edge of its respective said support rail, one of each of said primary locking bars of each one of said support rails cooperating to support a first one of said cross bars in an operative position generally perpendicularly between said support rails, and the other ones of said primary locking bars of said support rails being adapted to support a second one of said cross bars in said operative position extending generally perpendicularly between said support rails, and generally parallel to said first one of said cross bars;
each of said support rails further including a pair of secondary locking bars, said first one of said cross bars being secured to said secondary locking bars in a first one of said support rails when first one of said cross bars is placed in said elongated recess of said first one of said support rails, and said second one of said cross bars being secured to said second one of said support rails within said elongated recess thereof when said second one of said cross bars is placed in said stowed orientation; and
each said end support of each said cross bar including a locking assembly adapted to engage any of said locking bars, each said locking assembly including a user engageable actuating member for placing said locking assembly in latched and unlatched conditions relative to said support rails.

10. The system of claim 9, wherein:
said actuating member of each said locking assembly is pivotally supported from its associated said end support;
each said actuating member further includes a camming surface; and
each said locking assembly further includes a pivotally supported locking element having a cam follower surface that contacts said camming surface, said locking element being responsive to movement of said actuating member for latching selected said primary and secondary locking bars.

11. The system of claim 10, wherein each said locking element includes a projection, and each said actuating member includes a slot for receiving the projection to help maintain the actuating member aligned with the locking element during pivoting movement of the locking element and the actuating member.

12. The system of claim 9, wherein each said end support includes a housing having a tie down member adapted to engage with an external securing element.

13. The system of claim 9, wherein each said elongated recess includes a pair of pockets at opposite ends of thereof, each said pocket being of dimensions sufficiently large to house one of said end supports therein.

14. The system of claim 9, wherein a housing of each said end support includes a recess for aiding a user in grasping said actuating member.

15. The system of claim 9, wherein a portion of each said primary locking bar has a section to which an external article fastening element is attachable.

16. The system of claim 9, wherein each said cross bar sits elevationally above said support rails when said cross bars are secured in their said operative positions.

17. A vehicle article carrier system comprising:
a pair of support rails fixedly secured to an outer body surface of a vehicle;
a pair of cross bars each having opposing ends, with each said opposing end including an end support;
each of said support rails including an elongated recess extending parallel to a longitudinal axis thereof, said elongated recess being shaped generally in accordance with said cross bar, for receiving an associated one of said cross bars when said associated one of said cross bars is placed in a stowed orientation, and such that an upper surface of said associated one of said cross bars is generally flush with an upper surface of its associated said support rail;
each of said support rails further including a pair of spaced apart primary locking bars disposed along and parallel with an inside longitudinal edge of its respective said support rail, and further such that the primary locking bar protrudes at least slightly above the inside longitudinal edge of its respective said support rail, one of each of said primary locking bars of each one of said support rails cooperating to support a first one of said cross bars in an operative position generally perpendicularly between said support rails, and the other ones of said primary locking bars of said support rails being adapted to support a second one of said cross bars in said operative position extending generally perpendicularly between said support rails, and generally parallel to said first one of said cross bars;
each of said support rails further including a pair of secondary locking bars, said first one of said cross bars being secured to said secondary locking bars in a first one of said support rails when first one of said cross bars is placed in said elongated recess of said first one of said support rails, and said second one of said cross bars being secured to said second one of said support rails within said elongated recess thereof when said second one of said cross bars is placed in said stowed orientation; and
each said end support of each said cross bar including a locking assembly adapted to engage any of said locking bars, each said locking assembly including:
a user engageable actuating member moveable between open and closed positions; and
a locking element responsive to movement of said user engageable actuating member for placing said locking assembly in latched and unlatched conditions relative to said support rails.

18. The system of claim 17, wherein each of said user engageable actuating member and said locking member are pivotally supported within a respective one of said end supports.

19. The system of claim 18, wherein said locking element includes a hook portion for engaging ones of said primary and secondary locking bars, depending on an orientation that its associated said cross bar is placed in.

20. The system of claim 17, wherein said actuating member includes a slot and said locking element includes a projection that engages within said slot as said actuating member and said locking element move pivotally.

* * * * *